(12) United States Patent　　　(10) Patent No.:　US 9,594,454 B2
Kida　　　　　　　　　　　　　　　　(45) Date of Patent:　Mar. 14, 2017

(54) TOUCH-PANEL SUBSTRATE AND ELECTRONIC DEVICE

(71) Applicant: Sharp Kabushiki Kaisha, Osaka-shi, Osaka (JP)

(72) Inventor: Kazutoshi Kida, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 50 days.

(21) Appl. No.: 14/772,200

(22) PCT Filed: Feb. 10, 2014

(86) PCT No.: PCT/JP2014/053061
§ 371 (c)(1),
(2) Date: Sep. 2, 2015

(87) PCT Pub. No.: WO2014/156340
PCT Pub. Date: Oct. 2, 2014

(65) Prior Publication Data
US 2016/0011713 A1　　Jan. 14, 2016

(30) Foreign Application Priority Data

Mar. 29, 2013　(JP) ................................ 2013-074407

(51) Int. Cl.
*G06F 3/041* (2006.01)
*G06F 3/044* (2006.01)
*G06F 3/047* (2006.01)

(52) U.S. Cl.
CPC ............ *G06F 3/0416* (2013.01); *G06F 3/044* (2013.01); *G06F 3/047* (2013.01);
(Continued)

(58) Field of Classification Search
CPC ........ G06F 3/044; G06F 3/0416; G06F 3/047; G06F 2203/04112; G06F 2203/04103; G06F 2203/04111
See application file for complete search history.

(56) References Cited

U.S. PATENT DOCUMENTS 8,586,874 B2 * 11/2013 Kuriki ..................... G06F 3/044
　　　　　　　　　　　　　　　　　　　　174/250
8,686,308 B2 * 4/2014 Kuriki ..................... G06F 3/044
　　　　　　　　　　　　　　　　　　　　200/512
(Continued)

FOREIGN PATENT DOCUMENTS

JP　　2011-59771 A　　3/2011
JP　　2012-14669 A　　1/2012
JP　　2012-108845 A　　6/2012

*Primary Examiner* — Christopher E Leiby
(74) *Attorney, Agent, or Firm* — Keating & Bennett, LLP

(57) ABSTRACT

Provided are (i) a touch panel substrate having improved uniformity in in-plane light transmittance and (ii) an electronic device including that touch panel substrate. First electrodes (11) each include a first protrusion (15), the first protrusions (15) each have an intersection at which two conductor lines cross each other, second electrodes (21) each include a second protrusion (25), the second protrusions (25) each have an intersection at which two conductor lines cross each other, and the plurality of first electrodes (11) and the plurality of second electrodes (21) are placed in such a manner that the plurality of first protrusions (15) and the plurality of second protrusions (25) engage alternately with each other in a plan view.

10 Claims, 25 Drawing Sheets

(52) U.S. Cl.
CPC .............. *G06F 2203/04103* (2013.01); *G06F 2203/04111* (2013.01); *G06F 2203/04112* (2013.01)

(56) References Cited

U.S. PATENT DOCUMENTS

| | | | | |
|---|---|---|---|---|
| 9,386,691 | B2* | 7/2016 | Kuriki | G06F 3/041 |
| 2004/0239650 | A1* | 12/2004 | Mackey | G06F 3/044 |
| | | | | 345/174 |
| 2009/0051620 | A1* | 2/2009 | Ishibashi | H01Q 1/243 |
| | | | | 343/897 |
| 2010/0060596 | A1* | 3/2010 | Whight | G06F 3/044 |
| | | | | 345/173 |
| 2011/0096016 | A1* | 4/2011 | Yilmaz | G06F 3/044 |
| | | | | 345/174 |
| 2012/0118614 | A1 | 5/2012 | Kuriki | |
| 2012/0212449 | A1 | 8/2012 | Kuriki | |
| 2012/0312677 | A1* | 12/2012 | Kuriki | G06F 3/044 |
| | | | | 200/600 |
| 2013/0327560 | A1* | 12/2013 | Ichiki | G06F 3/044 |
| | | | | 174/133 R |
| 2014/0076612 | A1* | 3/2014 | Kuriki | G06F 3/041 |
| | | | | 174/250 |
| 2014/0232959 | A1* | 8/2014 | Kuriki | G06F 3/044 |
| | | | | 349/12 |

* cited by examiner

F I G. 1
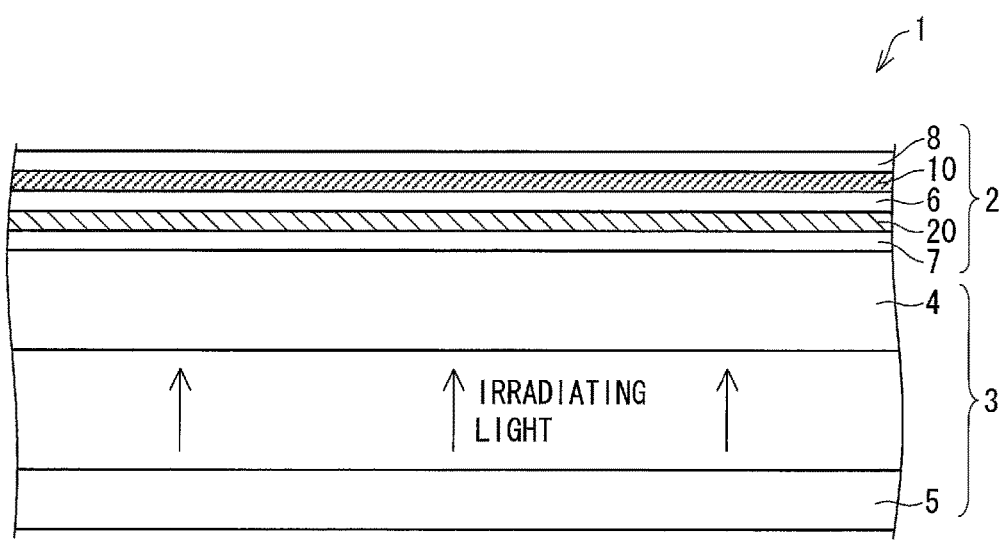

F I G. 8
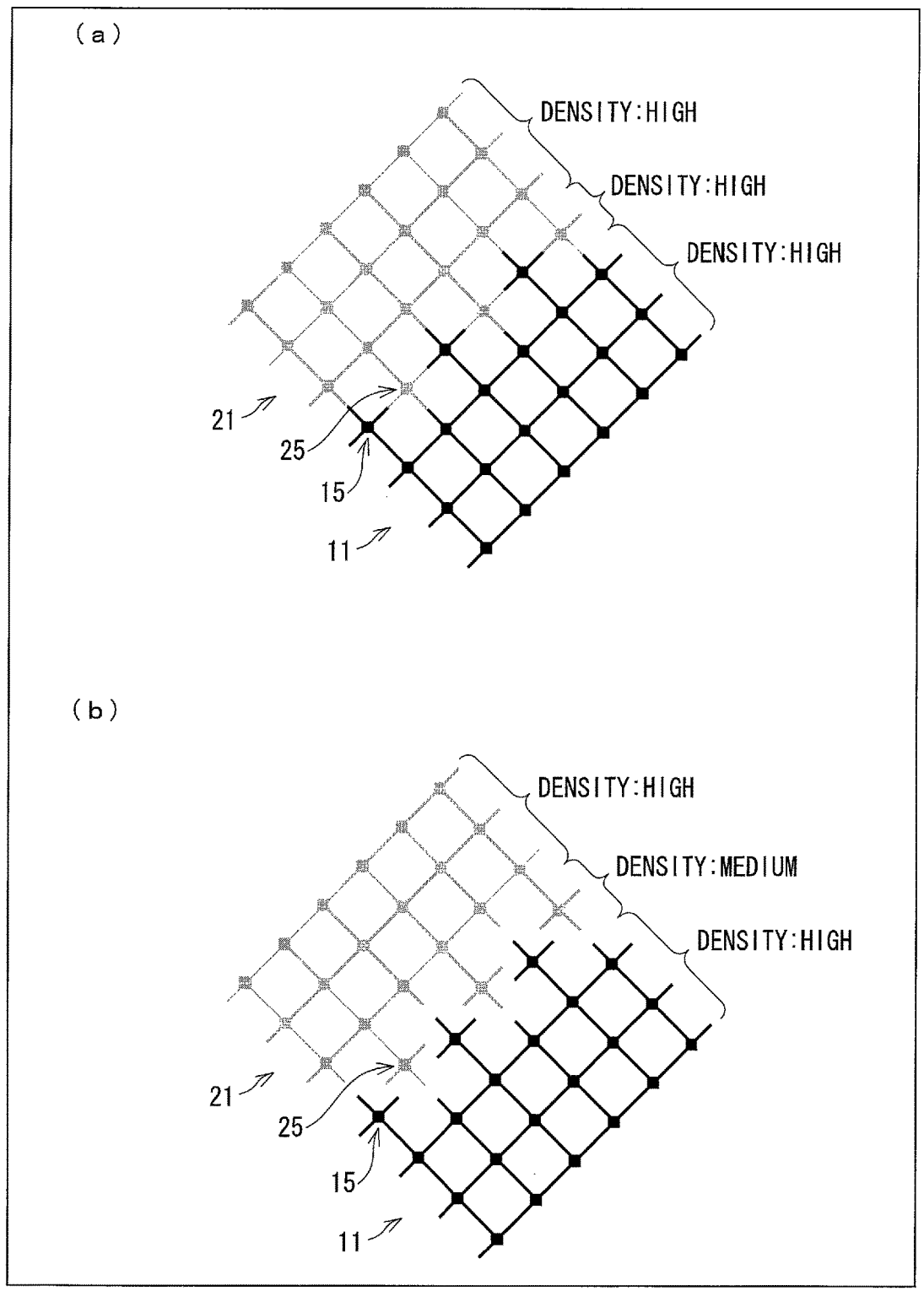

F I G. 1 9
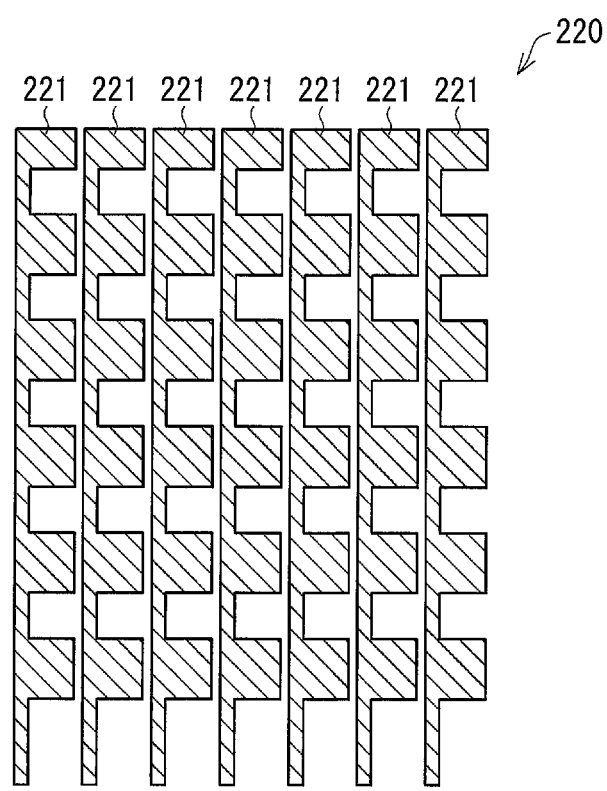

TOUCH-PANEL SUBSTRATE AND ELECTRONIC DEVICE

TECHNICAL FIELD

The present invention relates to a touch panel substrate and an electronic device including the touch panel substrate.

BACKGROUND ART

A touch panel includes, as its sensor electrodes, transparent electrodes made of, for example, ITO (indium oxide). A touch panel for a large screen is, however, problematic in that its sensor electrodes made of ITO, have a large electric resistance, with the result of a decrease in the detection sensitivity of the touch panel.

In view of the above problem, there has been known a technique in which a touch panel includes, as its sensor electrodes, conductor lines in a net-like pattern to both maintain adequate light transmittance and decrease the electric resistance of the sensor electrodes.

Patent Literature 1 discloses forming sensor electrodes for a touch panel by (i) cutting a mesh pattern into different portions and (ii) separating those portions from each other in such a manner that the separation line is not conspicuous.

However, even in a case where sensor electrodes are formed as in Patent Literature 1, gaps are formed between adjacent sensor electrodes. This results in locally increased light transmittance. Thus, an electronic device including a combination of such a touch panel and a display device unfortunately lets a pattern be visually recognizable which pattern corresponds to the gaps, with the result of a decrease in the quality of a display image.

This indicates that in a case where a touch panel includes, as its sensor electrodes, conductor lines in a net-like pattern, those conductor lines are preferably in a uniform net-like pattern to maintain uniformity of light transmittance over the detection surface.

FIGS. 22 through 24 are each a view for describing a touch panel conductive film of Patent Literature 2. FIG. 22 is a plan view of a first conductive pattern in a first conductive film. FIG. 23 is a plan view of a second conductive pattern in a second conductive film. FIG. 24 is a plan view of a layered conductive film including the first conductive film and the second conductive film attached to each other.

As illustrated in FIG. 22, the first conductive film includes a first conductive section 514A having (i) first conductive patterns 520A each extending in the m direction of FIG. 22 and including thin metal lines 516 and (ii) first auxiliary patterns 540A arranged around the first conductive patterns 520A. The first conductive patterns 520A each include two or more first large grids 530A connected to each other. The first large grids 530A each include two or more small grids 550 combined with each other.

Further, as illustrated in FIG. 23, the second conductive film includes a second conductive section 514B having (i) second conductive patterns 520B each extending in the n direction of FIG. 23 and including thin metal lines 516 and (ii) second auxiliary patterns 540B arranged around the second conductive patterns 520B.

The second conductive patterns 520B each include two or more second large grids 530B connected to each other. The second large grids 530B each include two or more small grids 550 combined with each other.

In a case where the first conductive film 510A having the above configuration is attached to the second conductive film 510B having the above configuration so as to form a layered conductive film 500, the first auxiliary patterns 540A and the second auxiliary patterns 540B face each other in a plan view so as to form combination patterns 560. As a result, the layered conductive film 500 shows, as viewed from above, a large number of closely arranged small grids 550 as illustrated in FIG. 24. This arrangement causes the boundaries between the first large grids 530A and the second large grids 530B to be less conspicuous, with the result of improved viewability.

Patent Literature 3 similarly discloses that in a case where two conductive sheets are attached to each other, a large number of small grids are arranged in a plan view and that such an arrangement causes the boundaries between first large grids and second large grids to be less conspicuous.

CITATION LIST

Patent Literature 1

Japanese Patent Application Publication Tokukai No. 2011-59771 (Publication date: Mar. 24, 2011)

Patent Literature 2

Japanese Patent Application Publication Tokukai No. 2012-108845 (Publication date: Jun. 7, 2012)

Patent Literature 3

Japanese Patent Application Publication Tokukai No. 2012-14669 (Publication date: Jan. 19, 2012)

SUMMARY OF INVENTION

Technical Problem

Unfortunately, even a touch panel substrate including, as its electrode layers, the conductive films of Patent Literature 2 or the conductive sheets of Patent Literature 3 problematically has ununiform in-plane light transmittance. This problem arises mainly from two causes.

A first one of the two causes is mispositioning between electrode layers. Specifically, an undesirable change in the relative positional relationship between the two electrode layers leaves a gap between the two sensor electrodes in a plan view, with the result of high light transmittance at the gap.

FIG. 25 illustrates views for describing light transmittance of a touch panel substrate including, as electrode layers, the conductive films disclosed in Patent Literature 2. (a) of FIG. 25 is a plan view of part of a touch panel substrate including two electrode layers properly positioned relative to each other. (b) of FIG. 25 is a plan view of part of a touch panel substrate including two electrode layers not properly positioned relative to each other.

As illustrated in (a) of FIG. 25, in a case where two electrode layers are properly positioned relative to each other, a sensor electrode included in one of the two sensor electrode layers and a sensor electrode included in the other sensor electrode layer form a net-like pattern of conductor lines which pattern is substantially uniform in a plan view.

The relative positional relationship between two electrode layers may, however, vary depending on the individual touch panel substrate during a production process, and a touch panel substrate produced may consequently include two electrode layers not properly positioned relative to each other as illustrated in (b) of FIG. 25. In such a case, the sensor electrode included in one of the two sensor electrode layers and the sensor electrode included in the other sensor electrode layer are apart from each other and thereby form a gap therebetween in a plan view. This results in high light transmittance at the gap between the sensor electrodes in a plan view.

A second one of the two causes for ununiform in-plane light transmittance of a touch panel substrate is ununiformity in respective line widths of individual conductor lines.

Conductor lines of a touch panel substrate may be wider at their intersections than at the other portions. Conductor lines formed through etching, in particular, tends to be wider at their intersections. The touch panel substrate, in such a case, has lower light transmittance at the intersections of conductor lines than in the other regions.

In a case where a touch panel substrate includes the conductive films of Patent Literature 2 as electrode layers, the conductor lines do not intersect each other at and near the boundary between the sensor electrodes in a plan view as illustrated in FIG. 25. The touch panel substrate consequently has high light transmittance at and near the boundary.

As described above, conventional touch panel substrates have ununiform in-plane light transmittance. Such a touch panel substrate, as combined with a display device, unfortunately lets a viewer of a display image of the display device visually recognize a pattern arising from a difference in light transmittance.

The present invention has been made in view of the above problem. It is an object of the present invention to provide (i) a touch panel substrate having improved uniformity in in-plane light transmittance and (ii) an electronic device including that touch panel substrate.

Solution to Problem

In order to attain the above object, a touch panel substrate in accordance with an aspect of the present invention is a touch panel substrate, including: a first electrode layer; a second electrode layer; and an insulating layer, the first electrode layer and the second electrode layer facing each other so as to sandwich the insulating layer, the first electrode layer including a plurality of first electrodes which are arranged next to each other and each of which includes conductor lines in a net-like pattern, the second electrode layer including a plurality of second electrodes which are arranged next to each other and each of which includes conductor lines in a net-like pattern, the plurality of first electrodes each including, at a portion parallel to an outer edge of an adjacent second electrode, a plurality of first protrusions protruding toward the adjacent second electrode in a plan view, the plurality of first protrusions each having an intersection at which two conductor lines cross each other, the plurality of second electrodes each including, at a portion parallel to an outer edge of an adjacent first electrode, a plurality of second protrusions protruding toward the adjacent first electrode in a plan view, the plurality of second protrusions each having an intersection at which two conductor lines cross each other, the plurality of first electrodes and the plurality of second electrodes being placed in such a manner that the plurality of first protrusions and the plurality of second protrusions engage alternately with each other in a plan view.

Advantageous Effects of Invention

An aspect of the present invention makes it possible to provide a touch panel substrate having improved uniformity in in-plane light transmittance.

BRIEF DESCRIPTION OF DRAWINGS

FIG. 1 is a cross-sectional view of an electronic device 1 of Embodiment 1 of the present invention.

FIG. 8 illustrates views for describing light transmittance of a touch panel substrate of Embodiment 1. (a) of FIG. 8 is a plan view of part of a touch panel substrate in which a first electrode layer and a second electrode layer are properly positioned relative to each other. (b) of FIG. 8 is a plan view of part of a touch panel substrate in which a first electrode layer and a second electrode layer are not properly positioned relative to each other.

FIG. 12 is a plan view of part of a touch panel substrate including a first electrode layer and a second electrode layer not properly positioned relative to each other.

FIG. 13 is a plan view of part of a touch panel substrate including a first electrode layer and a second electrode layer not properly positioned relative to each other.

FIG. 14 is a plan view of part of a touch panel substrate including a first electrode layer and a second electrode layer not properly positioned relative to each other.

FIG. 15 is a plan view of part of a touch panel substrate including a first electrode layer and a second electrode layer not properly positioned relative to each other.

FIG. 19 is a plan view of a configuration of second electrode layers included in a touch panel substrate of Embodiment 3 of the present invention.

DESCRIPTION OF EMBODIMENTS

Embodiment 1

Figure 2:
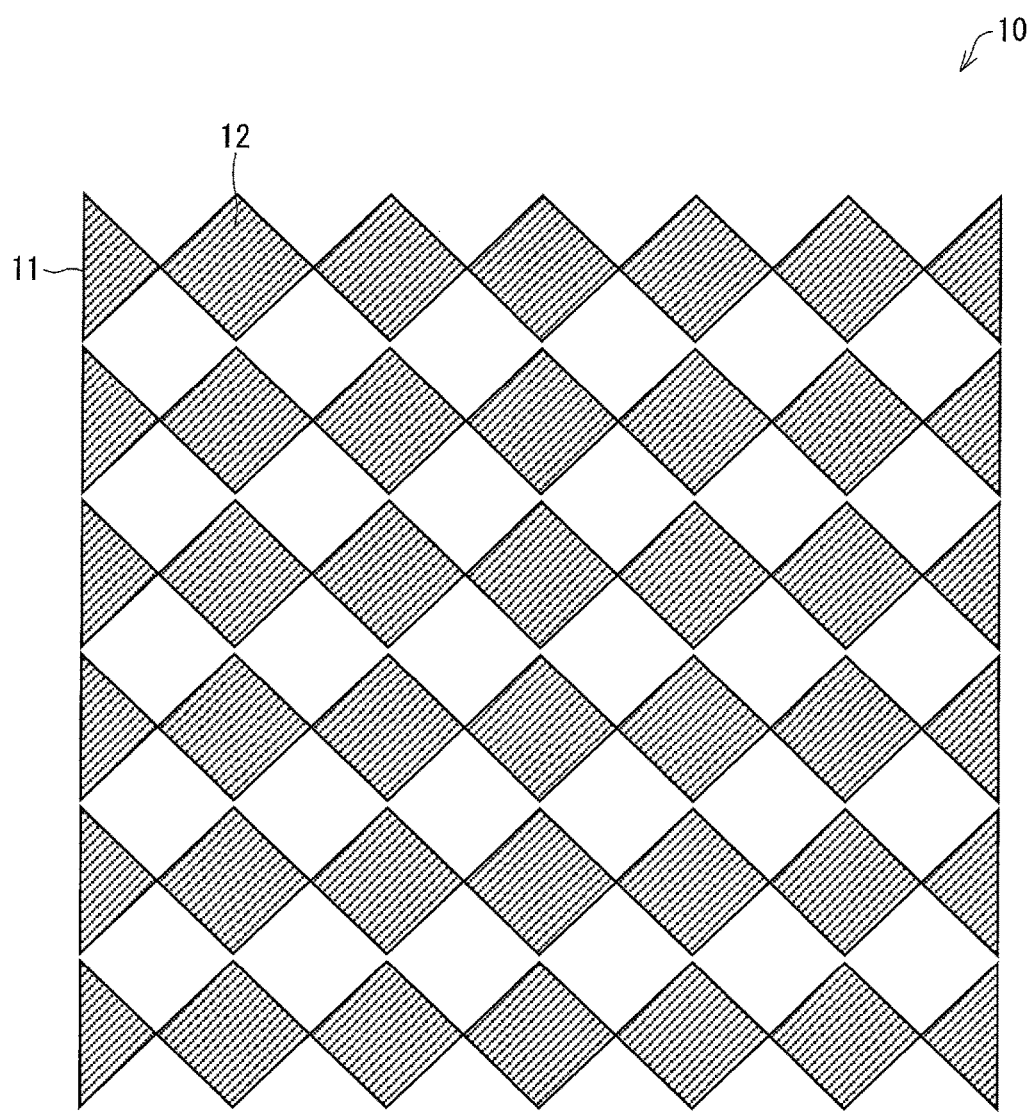
FIG. 2 is a plan view of a configuration of a first electrode layer included in a touch panel substrate of Embodiment 1 of the present invention.

The following description will discuss an embodiment of the present invention with reference to FIGS. 1 through 9.

FIG. 1 is a cross-sectional view of an electronic device 1 of the present embodiment. As illustrated in FIG. 1, the electronic device 1 includes a touch panel substrate 2 and a display device 3.

The display device 3 may be any of various display devices such as a liquid crystal display device or an organic EL display device. The display device 3 includes a display panel 4 and a backlight 5 provided on a back surface side of the display panel 4 (that is, on a side opposite to a display surface) so as to irradiate the display panel 4 with light. The display device 3 further includes various driving circuits (not shown) for controlling an image to be displayed on the display surface of the display panel 4.

<Touch Panel Substrate>

The touch panel substrate 2 is a capacitance type touch panel substrate provided on a display surface side (that is, on a user side) of the display panel 4. The touch panel substrate 2 includes a substrate 6, a first electrode layer 10, a second electrode layer 20, a first protection layer 8, and a second protection layer 7. The first electrode layer 10 is provided on a front surface of the substrate 6. The second electrode layer 20 is provided on a back surface of the substrate 6. That is, the first electrode layer 10 and the second electrode layer 20 are provided on respective planes different from each other so as to face each other across the substrate 6.

The substrate 6 can be made of an insulator such as glass or a plastic film. The substrate 6 functions as an insulating layer that electrically insulates the first electrode layer 10 from the second electrode layer 20.

The first protection layer 8 is provided on a front surface side of the first electrode layer 10. The second protection layer 7 is provided on a back surface side of the second electrode layer 20.

The first protection layer 8 provides a surface with which a detection target object comes into contact, and can be made of a light transmissive insulator such as glass or a plastic film. Similarly, the second protection layer 7 can be made of a light transmissive insulator such as glass or a plastic film. The second protection layer 7 may, for example, be adhered to the display panel 4.

<Electrode Layer>

The description below deals in detail with respective arrangements of the first electrode layer 10 and second electrode layer 20 included in the touch panel substrate 2 of the present embodiment. The touch panel substrate 2 is structured such that the first electrode layer 10 and the second electrode layer 20 are placed over each other in a plan view.

Figure 3:
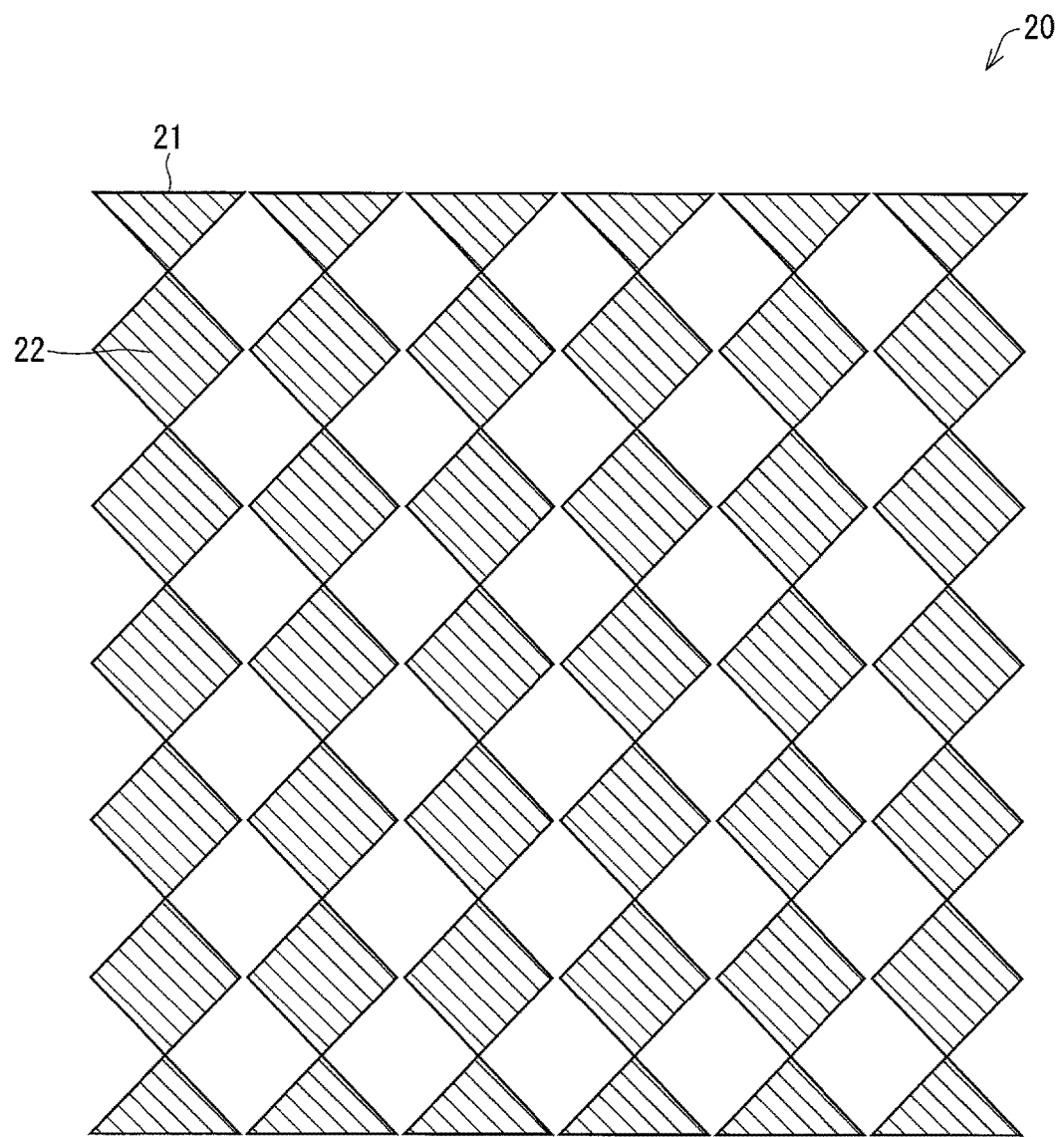
FIG. 3 is a plan view of a configuration of a second electrode layer included in a touch panel substrate of Embodiment 1 of the present invention.

FIG. 2 is a plan view of a configuration of the first electrode layer 10 included in the touch panel substrate 2 of the present embodiment. FIG. 3 is a plan view of a configuration of the second electrode layer 20 included in the touch panel substrate of the present embodiment.

As illustrated in FIG. 2, the first electrode layer 10 includes a plurality of electrodes for a first sensor (hereinafter referred to as "first sensor electrodes 11") which electrodes extend in a lateral direction in FIG. 2. The first sensor electrodes 11 (first electrodes) each have a plurality of quadrangular grid electrodes 12 (first grid electrodes). Adjacent ones of the plurality of grid electrodes 12 are connected to each other at vertices thereof.

As illustrated in FIG. 3, the second electrode layer 20 includes a plurality of electrodes for a second sensor (hereinafter referred to as "second sensor electrodes 21") which electrodes extend in a vertical direction in FIG. 3. The second sensor electrodes 21 (second electrodes) each have a plurality of quadrangular grid electrodes 22 (second grid electrodes). Adjacent ones of the plurality of grid electrodes 22 are connected to each other at vertices thereof.

Figure 4:
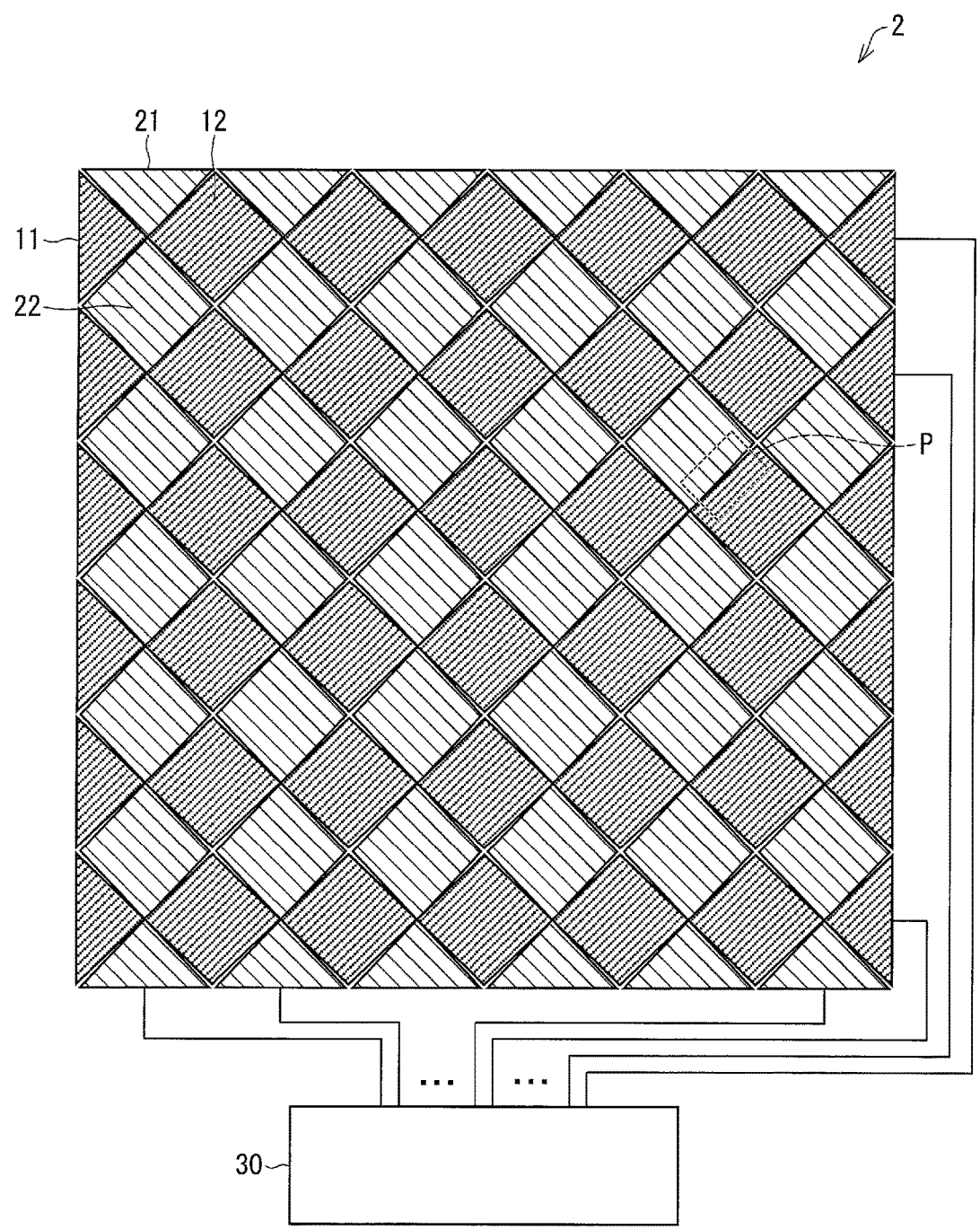
FIG. 4 is a plan view of a configuration of a touch panel substrate of Embodiment 1 in which configuration a first electrode layer and a second electrode layer are placed over each other.

FIG. 4 is a plan view of a configuration of the touch panel substrate 2 of the present embodiment in which configuration the first electrode layer 10 and the second electrode layer 20 are placed over each other.

The touch panel substrate 2 is structured as illustrated in FIG. 4: The first electrode layer 10 and the second electrode layer 20 are placed over each other so as to sandwich the substrate 6 in such a manner that (i) the first sensor electrodes 11 intersect the second sensor electrodes 21 in a plan view and that (ii) the grid electrodes 12 are separated from each other by the grid electrodes 22 in a plan view, whereas the grid electrodes 22 are separated from each other by the grid electrodes 12 in a plan view.

As shown in the region P enclosed by a broken line in FIG. 4, the first sensor electrodes 11 have respective outer edges parallel to respective outer edges of the second sensor electrodes 21 in a plan view.

The touch panel substrate 2 of the present embodiment, as described above, includes first sensor electrodes 11 and second sensor electrodes 21 each in the shape of quadrangles arranged next to each other. The first sensor electrodes 11 and the second sensor electrodes 21 are all connected to a position detecting circuit 30.

The first sensor electrodes 11 and the second sensor electrodes 21 form capacitances therebetween. In a case where a detection target object such as a human finger has come into contact with a surface of the touch panel substrate 2, such contact changes the respective values of capacitances. Detecting such changes in the respective values of capacitances with use of the position detecting circuit 30 makes it possible to specify that position on the surface (first protection layer 8) of the touch panel substrate 2 at which the detection target object is in contact.

The touch panel substrate 2, for example, applies drive voltages to the first sensor electrodes 11 and measures any change in the respective voltages of the second sensor electrodes 21 to specify a first sensor electrode 11 (row) and a second sensor electrode 21 (column) that form a capacitance whose value has changed.

The position detecting circuit 30 for detecting a coordinate position of a detection target object may be a known circuit.

The description below deals in greater detail with respective arrangements of the first sensor electrodes 11 and second sensor electrodes 21 included in the touch panel substrate 2 of the present embodiment.

<First Sensor Electrodes>

Figure 5:
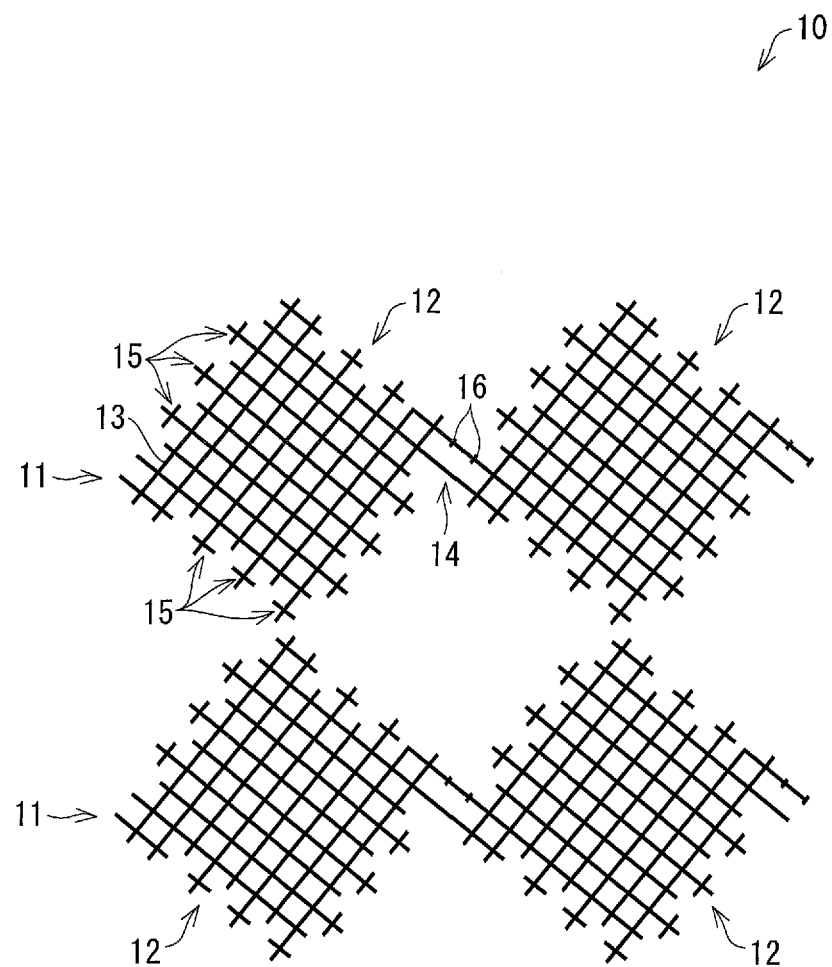
FIG. 5 is a plan view of a detailed arrangement of a first electrode layer of Embodiment 1 of the present invention.

FIG. 5 is a plan view of a detailed arrangement of the first electrode layer 10 of the present embodiment.

The first electrode layer 10 includes a plurality of first sensor electrodes 11 arranged next to each other. The first sensor electrodes 11 each include first conductor lines 13 (conductor lines) arranged on an identical plane in a net-like pattern. Each first sensor electrode 11 includes first conductor lines 13 electrically insulated from first conductor lines 13 included in any other first sensor electrode 11.

The first conductor lines 13 are arranged in a net-like pattern, and thus have intersections (cross portions), at each of which two first conductor lines 13 cross each other.

The first sensor electrodes 11 each include (i) a plurality of grid electrodes 12 each having a substantially quadrilateral outer edge and (ii) first connection sections 14 each electrically connecting two grid electrodes 12 to each other. The first sensor electrodes 11 each include a plurality of grid electrodes 12 connected in series by the first connection sections 14.

Each grid electrode 12, which includes first conductor lines 13 arranged in a net-like pattern, has a large number of unit squares (minimum unit squares; squares with the smallest area). In each grid electrode 12, a large number of unit squares constitute a single large square (square with the largest area). Each large square has intersections regularly positioned in a matrix.

The grid electrodes 12 each include a plurality of first protrusions 15 in addition to a large square.

(First Protrusions)

The grid electrodes 12 each include a plurality of first protrusions 15 along its outer edge. The first protrusions 15 are each a portion of a grid electrode 12 which portion protrudes from the large square toward a second sensor electrode 21. The first protrusions 15 of a grid electrode 12 are provided around the large unit so as to protrude outward.

The first protrusions 15 each include (i) a portion of a first conductor line 13 that serves as a side of each of some unit squares and (ii) a first conductor line 13 crossing the above portion.

The first protrusions 15 are, in other words, each formed of two first conductor lines 13 in the shape of a cross. The first protrusions 15 thus each have an intersection, at which two first conductor lines 13 cross each other.

(First Connection Sections)

The first connection sections 14 are each formed of first conductor lines 13 included in corresponding grid electrodes 12, and each include respective extensions of such first conductor lines 13.

As illustrated in FIG. 5, the first connection sections 14 are each formed of, in addition to two first conductor lines 13, two auxiliary wires 16 crossing one of the two first conductor lines 13.

The first connection sections 14 thus each have two intersections. Those intersections are spaced at an interval equal to the interval at which the intersections in each large square are spaced.

The first sensor electrodes 11 of the present embodiment are each arranged such that the first connection sections 14 are each formed of two first conductor lines 13. The first connection sections 14 may, however, alternatively be each formed of (i) a single first conductor line 13 or (ii) three or more first conductor lines 13.

<Second Sensor Electrodes>

Figure 6:
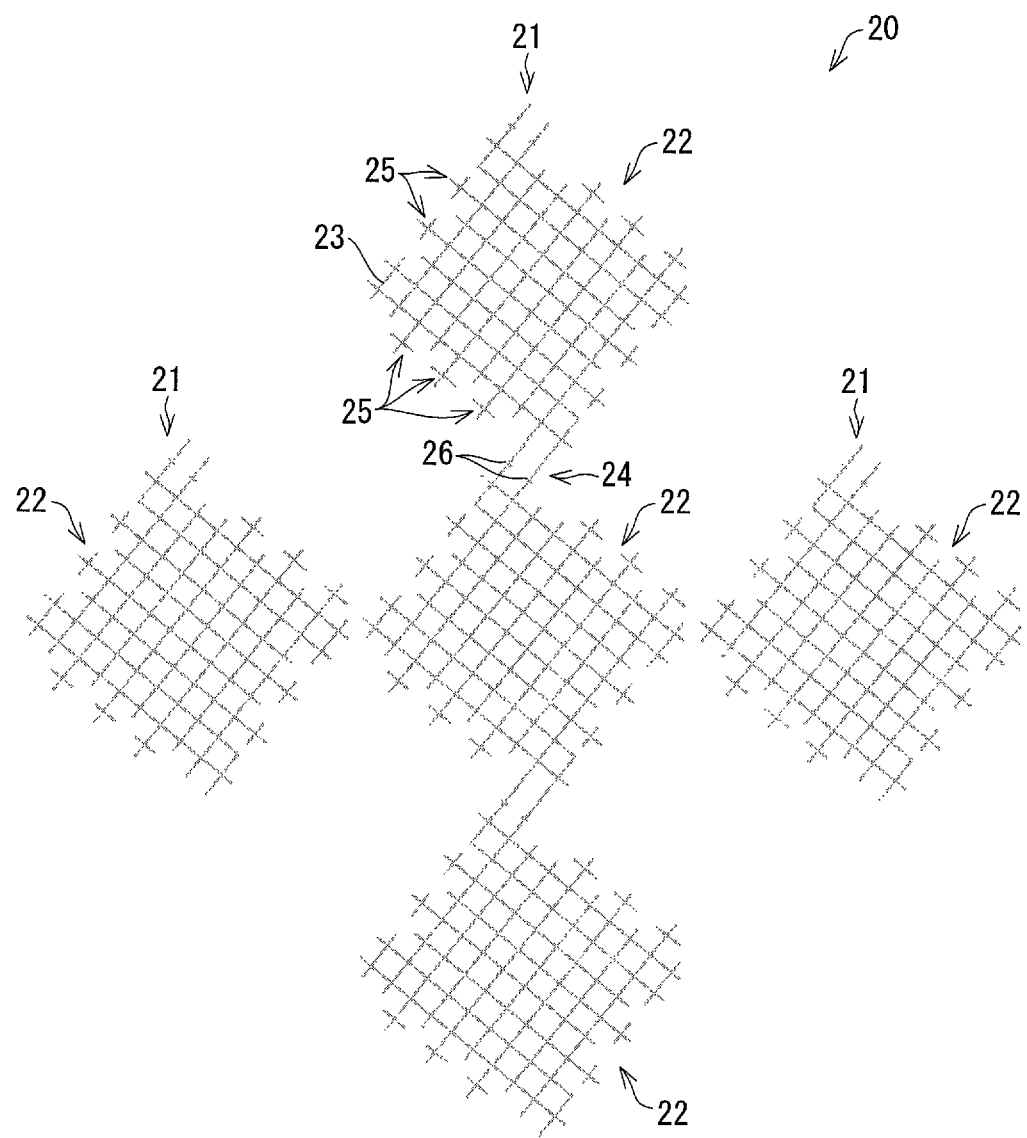
FIG. 6 is a plan view of a detailed arrangement of a second electrode layer of Embodiment 1 of the present invention.

FIG. 6 is a plan view of a detailed arrangement of the second electrode layer 20 of the present embodiment.

The second electrode layer 20 includes a plurality of second sensor electrodes 21 arranged next to each other. The second sensor electrodes 21 each include second conductor lines 23 (conductor lines) arranged on an identical plane in a net-like pattern. Each second sensor electrode 21 includes first conductor lines 23 electrically insulated from first conductor lines 23 included in any other second sensor electrode 21.

The second conductor lines 23 are arranged in a net-like pattern, and thus have intersections, (cross portions) at each of which two second conductor lines 23 cross each other.

The second sensor electrodes 21 each include (i) a plurality of grid electrodes 22 each having a substantially quadrilateral outer edge and (ii) second connection sections 24 each electrically connecting two grid electrodes 22 to each other. The second sensor electrodes 21 each include a plurality of grid electrodes 22 connected in series by the second connection sections 24.

Each grid electrode 22, which includes second conductor lines 23 arranged in a net-like pattern, has a large number of unit squares (minimum unit squares; squares with the smallest area). In each grid electrode 22, a large number of unit squares constitute a single large square (square with the largest area). Each large square has intersections regularly positioned in a matrix.

The grid electrodes 22 each include a plurality of second protrusions 25 in addition to a large square.

(Second Protrusions)

The grid electrodes 22 each include a plurality of second protrusions 25 along its outer edge. The second protrusions 25 are each a portion of a grid electrode 22 which portion protrudes from the large square toward a first sensor electrode 11. The second protrusions 25 of a grid electrode 22 are provided around the large unit so as to protrude outward.

The second protrusions 25 each include (i) a portion of a second conductor line 23 that serves as a side of each of some unit squares and (ii) a second conductor line 23 crossing the above portion.

The second protrusions 25 are, in other words, each formed of two second conductor lines 23 in the shape of a cross. The second protrusions 25 thus each have an intersection, at which two second conductor lines 23 cross each other.

(Second Connection Sections)

The second connection sections 24 are each formed of second conductor lines 23 included in corresponding grid electrodes 22, and each include respective extensions of such second conductor lines 23.

As illustrated in FIG. 6, the second connection sections 24 are each formed of, in addition to two second conductor lines 23, two auxiliary wires 26 crossing one of the two second conductor lines 23.

The second connection sections 24 thus each have two intersections. Those intersections are spaced at an interval equal to the interval at which the intersections in each large square are spaced.

The second sensor electrodes 21 of the present embodiment are each arranged such that the second connection sections 24 are each formed of two second conductor lines 23. The second connection sections 24 may, however, alternatively be each formed of (i) a single second conductor line 23 or (ii) three or more second conductor lines 23.

(Method for Forming Conductor Lines)

The first conductor lines 13 and the second conductor lines 23 may be made of a material having low electric resistance such as metal. For example, etching first conductor lines 13 and second conductor lines 23 on the substrate 6 can provide first sensor electrodes 11 and second sensor electrode 21.

Specifically, forming a thin film of copper or the like on the substrate 6 and etching the thin film with use of a mask having a net-like light-blocking portion provides a sensor electrode including a net-like copper wiring pattern.

An alternative manner is to (i) etch first conductor lines 13 and second conductor lines 23 in a thin film in advance to provide first sensor electrodes 11 and second sensor electrodes 21 and then (ii) attach those first sensor electrodes 11 and second sensor electrodes 21 onto the substrate 6.

Furthermore, the first conductor lines 13 and the second conductor lines 23 are not necessarily formed through etching, and may be formed by an alternative method.

<Uniformity in Light Transmittance Over Sensor Electrodes>

Figure 7:
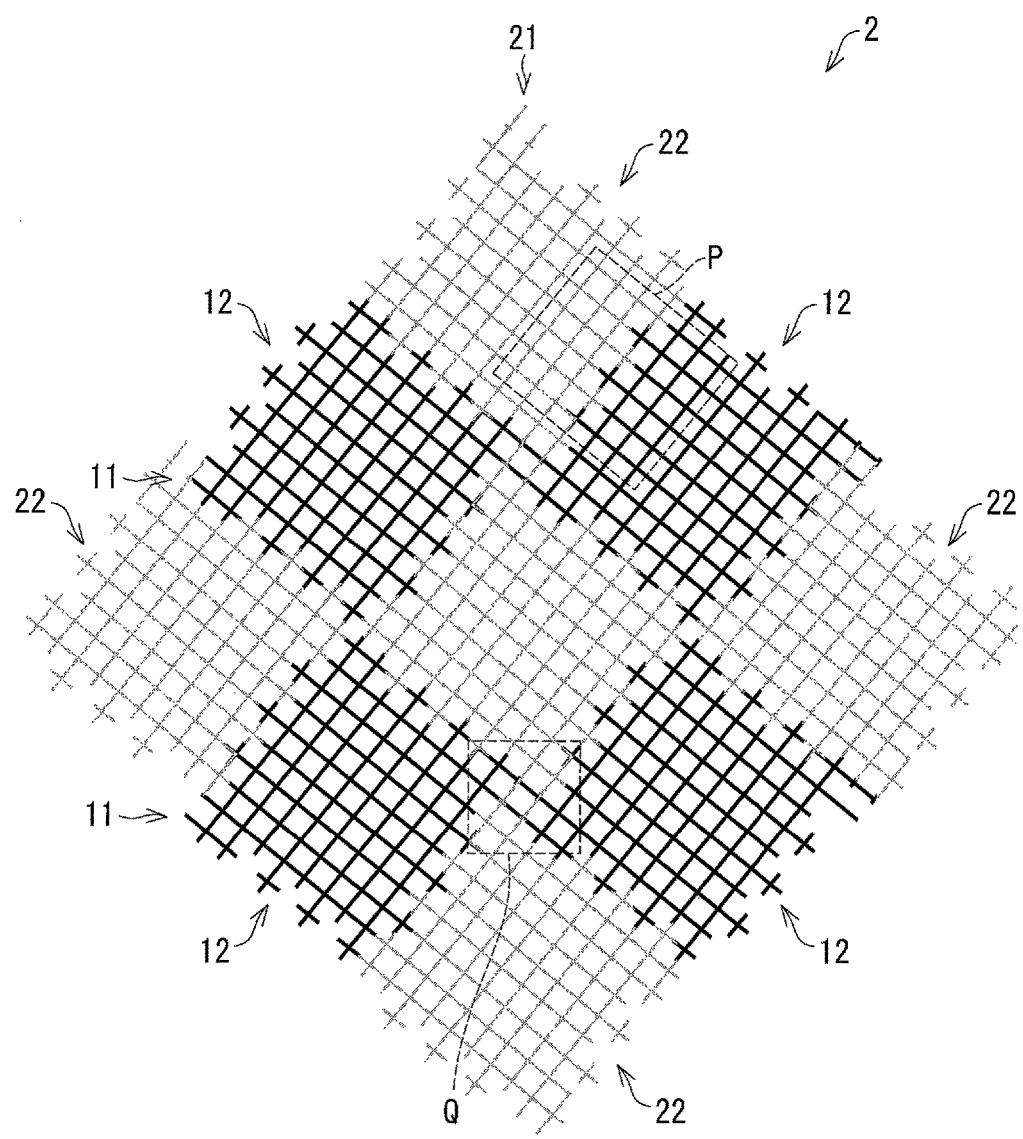
FIG. 7 is a plan view of a detailed configuration of a touch panel substrate of Embodiment 1 in which configuration a first electrode layer and a second electrode layer are placed over each other.

FIG. 7 is a plan view of a detailed configuration of the touch panel substrate 2 in which configuration the first electrode layer 10 and the second electrode layer 20 are placed over each other.

FIG. 8 illustrates views for describing light transmittance of the touch panel substrate 2 of the present embodiment. (a) of FIG. 8 is a plan view of part of a touch panel substrate 2 in which the first electrode layer 10 and the second electrode layer 20 are properly positioned relative to each other. (b) of FIG. 8 is a plan view of part of a touch panel substrate 2 in which the first electrode layer 10 and the second electrode layer 20 are not properly positioned relative to each other. (a) of FIG. 8 is an enlarged view of the region P enclosed by a broken line in FIG. 7.

As illustrated in FIG. 7, in a case where the first electric layer 10 and the second electric layer 20 are placed over each other, (i) the grid electrodes 12 are separated from each other by the grid electrodes 22, whereas the grid electrodes 22 are separated from each other by the grid electrodes 12, and (ii) the first connection sections 14 and the second connection sections 24 are placed over each other in a plan view.

Further, as illustrated in (a) of FIG. 8, each first sensor electrode 11 and any corresponding second sensor electrode 21 share a boundary, along which the first protrusions 15 and the second protrusions 25 engage alternately with each other. More specifically, (i) adjacent two of the first protrusions 15 are separated from each other by a second protrusion 25, and (ii) adjacent two of the second protrusions 25 are separated from each other by a first protrusion 15.

With the above configuration, the respective intersections in the first protrusions 15 and the respective intersections in the second protrusions 25 are arranged on a straight line in a plan view. In other words, the respective intersections in the first protrusions 15 and the respective intersections in the second protrusions 25 are in a nesting pattern.

The touch panel substrate 2 of the present embodiment includes first conductor lines 13 and second conductor lines 23 in a uniform net-like pattern (mesh pattern) in a plan view.

Further, the touch panel substrate 2 of the present embodiment has intersections arranged uniformly in a matrix in a plan view which intersections include (i) the intersections in the large grids of the first sensor electrodes 11, (ii) the intersections in the first protrusions 15, (iii) the intersections in the first connection sections 14, (iv) the intersections in the large grids of the second sensor electrodes 21, (v) the intersections in the second protrusions 25, and (vi) the intersections in the second connection sections 24.

(Ununiform Line Width)

In a case where conductor lines are etched, such etching leaves etching residue at intersections to form an etched pattern in a rhombic shape at each of the intersections. This causes the conductor lines to be wider at the intersections, with the result of an increased conductor line density and decreased light transmittance at each of the intersections.

Figure 25:
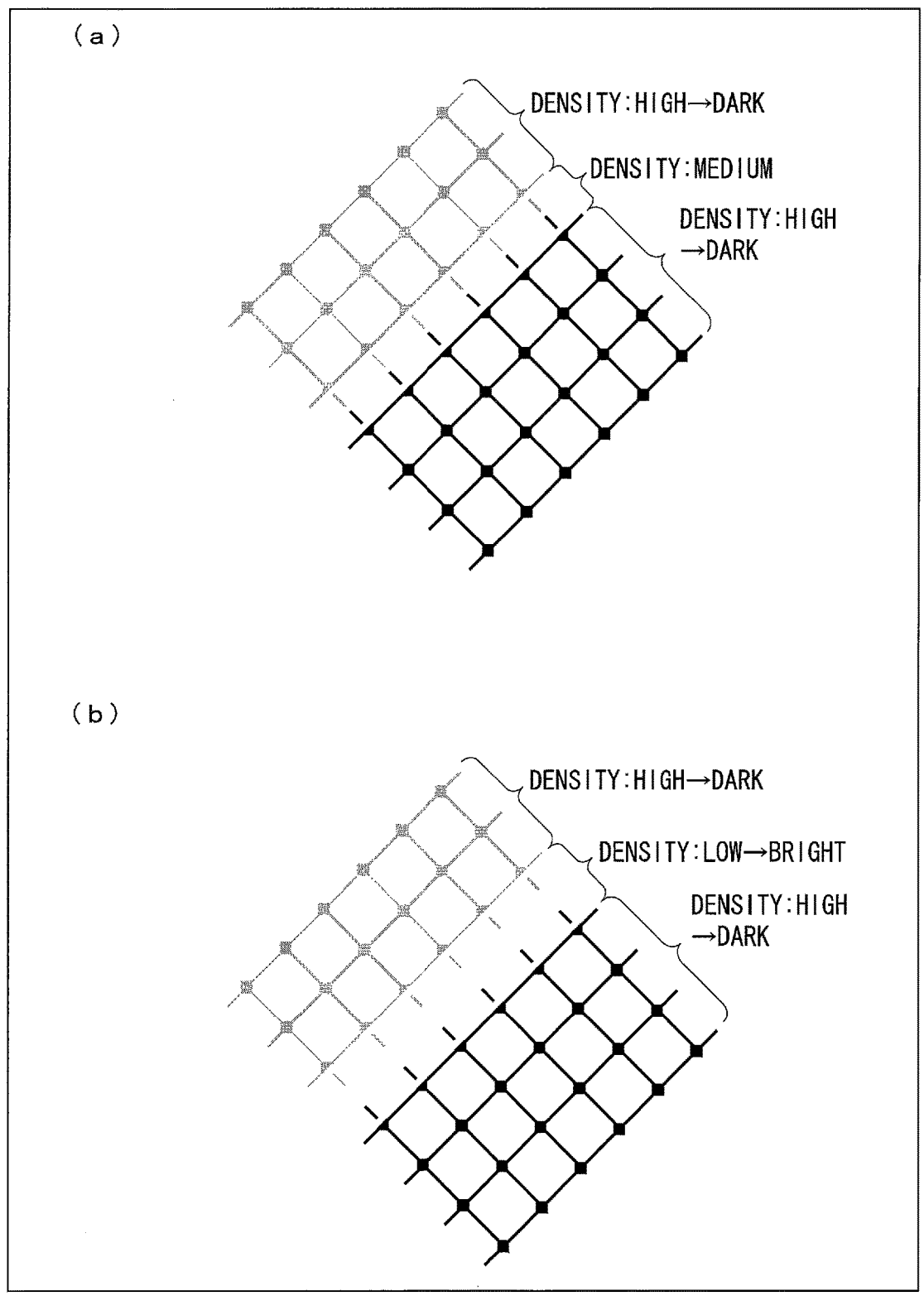
FIG. 25 illustrates views for describing light transmittance of a touch panel substrate including, as electrode layers, the conductive films disclosed in Patent Literature 2. (a) of FIG. 25 is a plan view of part of a touch panel substrate including two electrode layers properly positioned relative to each other. (b) of FIG. 25 is a plan view of part of a touch panel substrate including two electrode layers not properly positioned relative to each other.

With conventional touch panels, the conductor lines do not intersect each other at and near the boundary between the sensor electrodes in a plan view as illustrated in (a) of FIG. 25. Conventional touch panels consequently have high light transmittance at and near the boundary as compared to light transmittance in the other regions. Such conventional touch panels unfortunately let a viewer visually recognize a pattern of the boundary.

The touch panel substrate 2 of the present embodiment is, in contrast, arranged to (i) have intersections even at and near the boundary between each first sensor electrode 11 and any adjacent second sensor electrode 21 as illustrated in (a) of FIG. 8 and (ii) have intersections arranged uniformly in a matrix in a plan view as illustrated in FIG. 7.

With the above arrangement, even in a case where the conductor lines are wider at the intersections than in the other regions, the touch panel substrate 2 has uniform in-plane light transmittance.

(Mispositioning of the Electrode Layers)

A conventional touch panel substrates 2, in a case where two electrode layers are not properly positioned relative to each other, likely has gaps between adjacent sensor electrodes in a plan view as illustrated in (a) of FIG. 25. A conventional touch panel substrate has high light transmittance at such gaps and lets a pattern be visually recognizable which pattern corresponds to the gaps. Further, the gaps let portions with high light transmittance be in a straight line. The above pattern corresponding to the gaps is thus visually recognized easily.

In contrast, the touch panel substrate 2 of the present embodiment, which includes first protrusions 15 and second protrusions 25, less likely has gaps between the first sensor electrodes 11 and the second sensor electrodes 21 even in a case where the first electrode layer 10 and the second electrode layer 20 are not properly positioned relative to each other (see (b) of FIG. 8).

The touch panel substrate 2 of the present embodiment does not have, in a plan view, (i) a regular arrangement of regions in each of which an intersection is present or (ii) a regular arrangement of regions in each of which no intersection is present. The touch panel substrate 2 can thus alleviate a periodic structure. The touch panel substrate 2, in other words, does not have a linear arrangement of regions in each of which no intersection is present. The touch panel substrate 2, as a result, has only a small difference in light transmittance between (i) a region with high conductor line density and low light transmittance and (ii) a region with low conductor line density and high light transmittance.

The touch panel substrate 2, with the above arrangement, has uniform in-plane light transmittance even in a case where two electrode layers are not properly positioned relative to each other.

<Auxiliary Wires>

Figure 9:
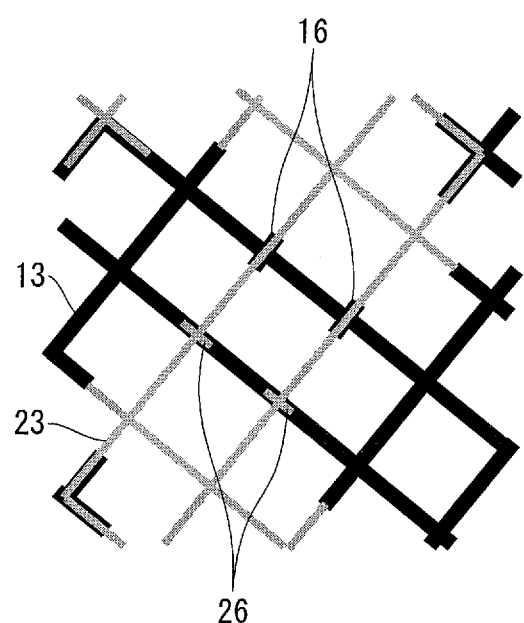
FIG. 9 is a plan view of a crossover section of a first connection section and a second connection section of a touch panel substrate of Embodiment 1 of the present invention, and is an enlarged view of the region Q enclosed by a line in FIG. 7.

FIG. 9 is a plan view of a crossover section of a first connection section and a second connection section, and is an enlarged view of the region Q enclosed by a line in FIG. 7. For convenience of description, FIG. 9 illustrates (i) first conductor lines 13 with a line width and (ii) second conductor lines 23 with a line width different from that of the first conductor lines 13.

The crossover section is arranged as illustrated in FIG. 9 such that in a plan view, (i) the auxiliary wires 16 are placed over a second conductor line 23 included in the second connection section 24, and (ii) the auxiliary wires 26 are placed over a first conductor line 13 included in the first connection section 14.

In a case where the first electrode layer 10 and the second electrode layer 20 are not properly positioned relative to each other, (i) the auxiliary wires 16 are not placed over a second conductor line 23, and (ii) the auxiliary wires 26 are not placed over a first conductor line 13.

In this case, the crossover section of the first connection section 14 and the second connection section 24 has high conductor line density in a plan view, and thus has lower light transmittance than the other regions.

In view of that, the auxiliary wires 16 and 26 of the present embodiment are preferably as short as possible. The auxiliary wires 16 and 26 may be, for example, shorter than the shorter one of the conductor lines crossing each other in each first protrusion 15 and second protrusion 25. Alternatively, the auxiliary wires 16 and 26 of the present embodiment may be, for example, not longer than a half of a side of a unit square.

The above arrangement prevents an increase in light transmittance in the crossover section of a first connection section 14 and a second connection section 24 even in a case where mispositioning between the first electrode layer 10 and the second electrode layer 20 has prevented (i) auxiliary wires 16 from being placed over second conductor lines 23 and (ii) auxiliary wires 26 from being placed over first conductor lines 13.

[Modification]

The following description will discuss, with reference to FIGS. 10 through 15, a modification of the touch panel substrate 2 of the present invention. For convenience of description, members of the modification that have functions identical to those described in the above embodiment are given identical reference numerals, and descriptions of such members will be omitted.

(Modification of Connection Sections)

The touch panel substrates 2 of Embodiment 1 is, as described above, arranged such that (i) the first connection sections 14 each include two auxiliary wires 16 crossing a single first conductor line 13 and that (ii) the second connection sections 24 each include two auxiliary wires 26 crossing a single second conductor line 23. The connection sections are, however, not necessarily arranged as such.

Figure 10:
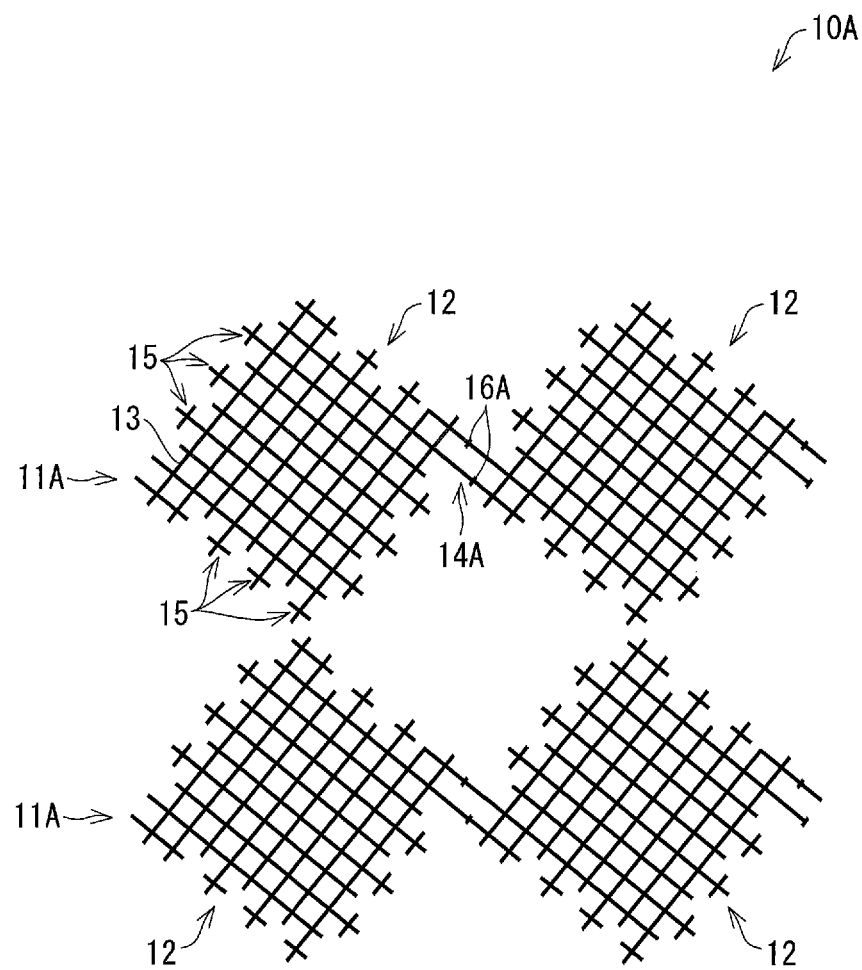
FIG. 10 is a plan view of a detailed configuration of a first electrode layer of a modification of the present invention.
Figure 11:
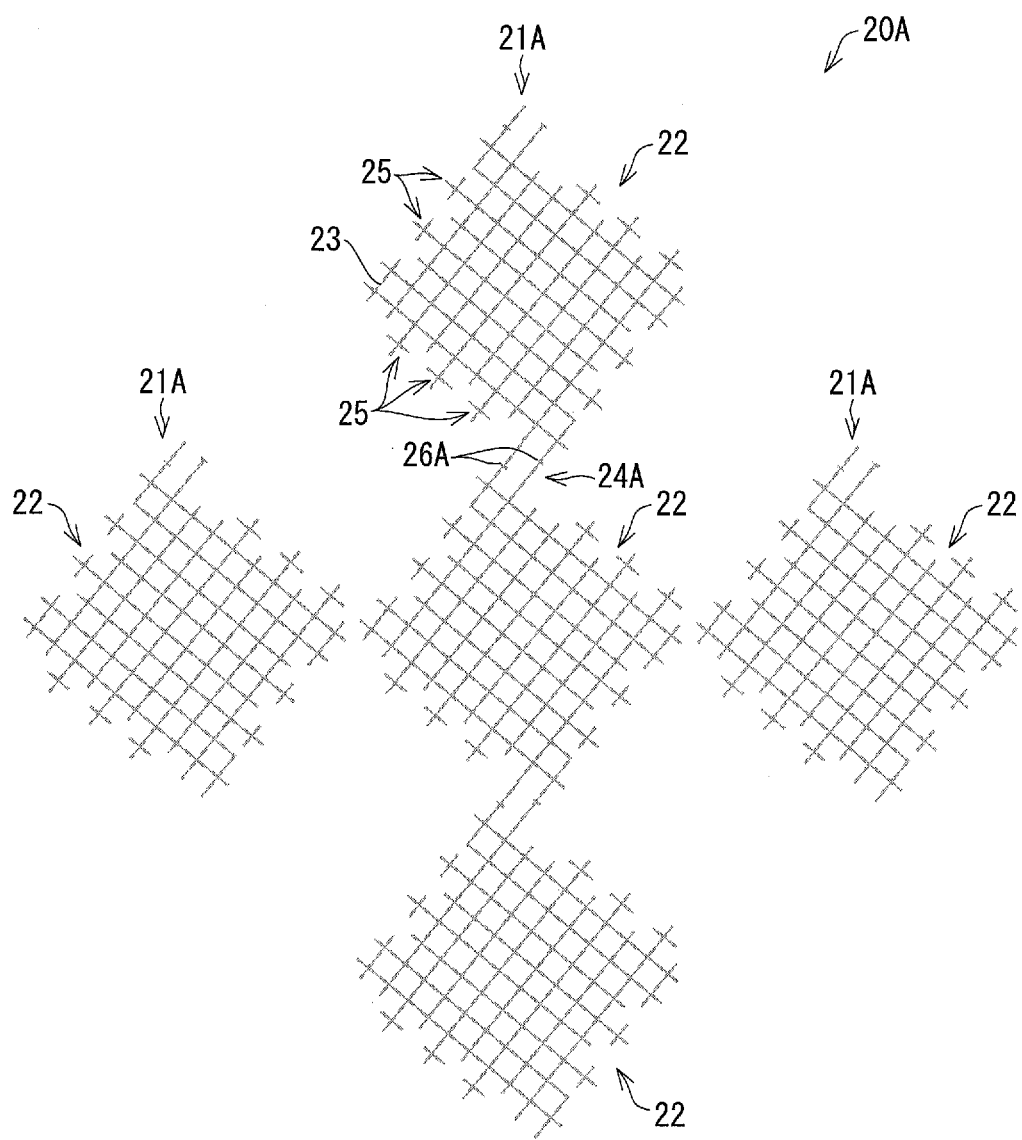
FIG. 11 is a plan view of a detailed configuration of a second electrode layer of a modification of the present invention.

FIG. 10 is a plan view of a detailed configuration of a first electrode layer 10A of the modification. FIG. 11 is a plan view of a detailed configuration of a second electrode layer 20A of the modification.

As illustrated in FIG. 10, the first electrode layer 10A includes first connection sections 14A each formed of (i) two first conductor lines 13 and (ii) two auxiliary wires 16A crossing the respective first conductive lines 13.

Similarly, as illustrated in FIG. 11, the second electrode layer 20A includes second connection sections 24A each formed of (i) two second conductor lines 23 and (ii) two auxiliary wires 26A crossing the respective second conductive lines 23.

Even with the above configuration, in a case where the first electrode layer 10A and the second electrode layer 20A are placed over each other, the touch panel substrate of the modification has intersections arranged uniformly in a matrix in a plan view which intersections include (i) the intersections in the large grids of the first sensor electrodes 11A, (ii) the intersections in the first protrusions 15, (iii) the intersections in the first connection sections 14A, (iv) the intersections in the large grids of the second sensor electrodes 21A, (v) the intersections in the second protrusions 25, and (vi) the intersections in the second connection sections 24A.

With the above arrangement, the touch panel substrate of the modification has uniform in-plane light transmittance similarly to the touch panel substrate 2 of Embodiment 1.

(Modification of Protrusions)

The touch panel substrates 2 of Embodiment 1 includes first protrusions 15 each formed of two first conductor lines 13 in the shape of a cross. The first protrusions are, however, not necessarily arranged as such.

FIGS. 12 through 15 each illustrate views for describing light transmittance of a touch panel substrate of the modification. (a) of each of FIGS. 12 through 15 is a plan view of part of a touch panel substrate including a first electrode layer and a second electrode layer properly positioned relative to each other. (b) of each FIGS. 12 through 15 is a plan view of part of a touch panel substrate including a first electrode layer and a second electrode layer not properly positioned relative to each other.

Figure 12:
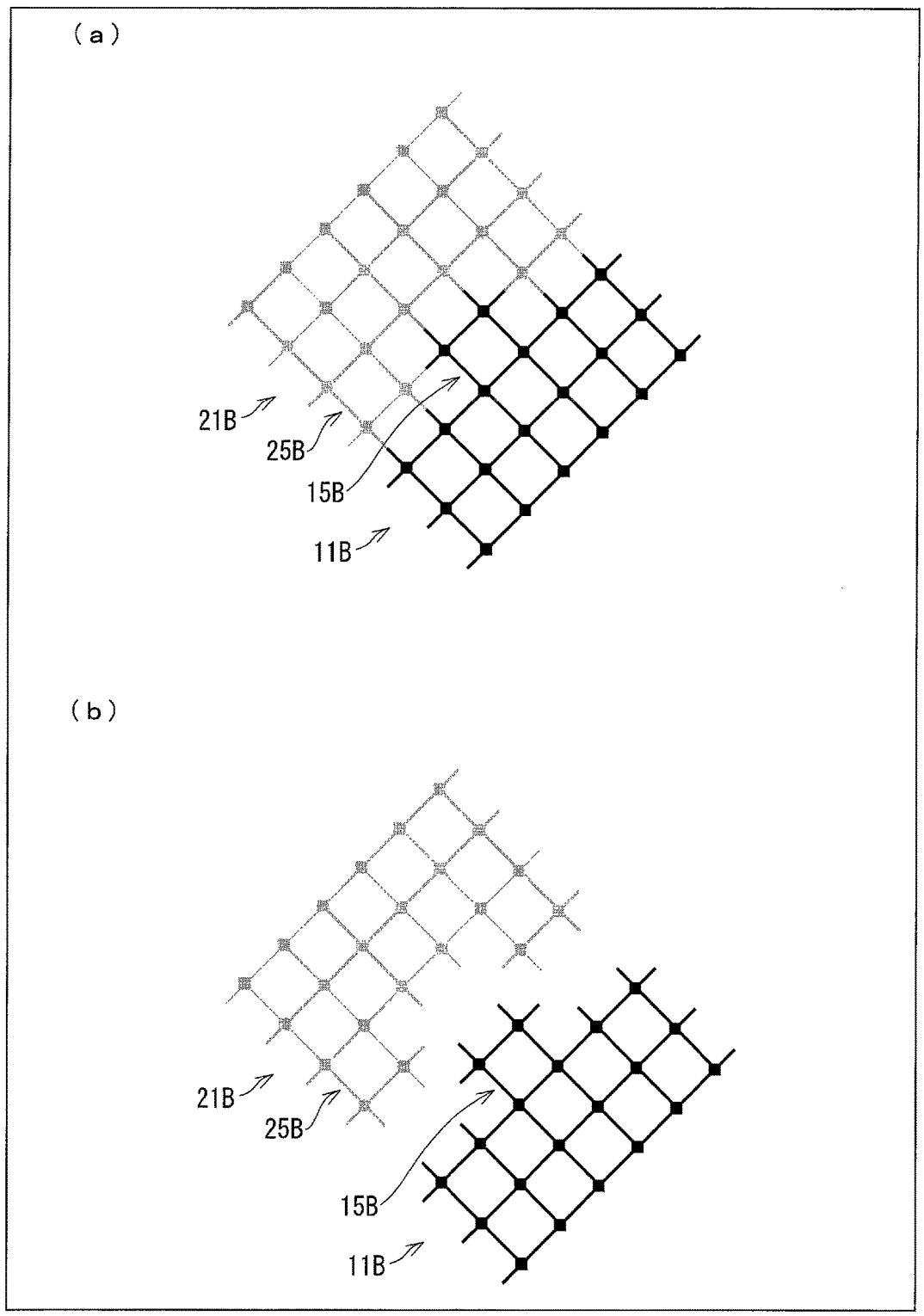
FIG. 12 illustrates views for describing light transmittance of a touch panel substrate of another modification of the present invention. (a) of FIG. 12 is a plan view of part of a touch panel substrate including a first electrode layer and a second electrode layer properly positioned relative to each other. (b) of each

FIG. 12 illustrates first protrusions 15B each (i) including a single unit square protruding from a large square and each (ii) having two intersections at respective two outer vertices of the unit square.

Figure 13:
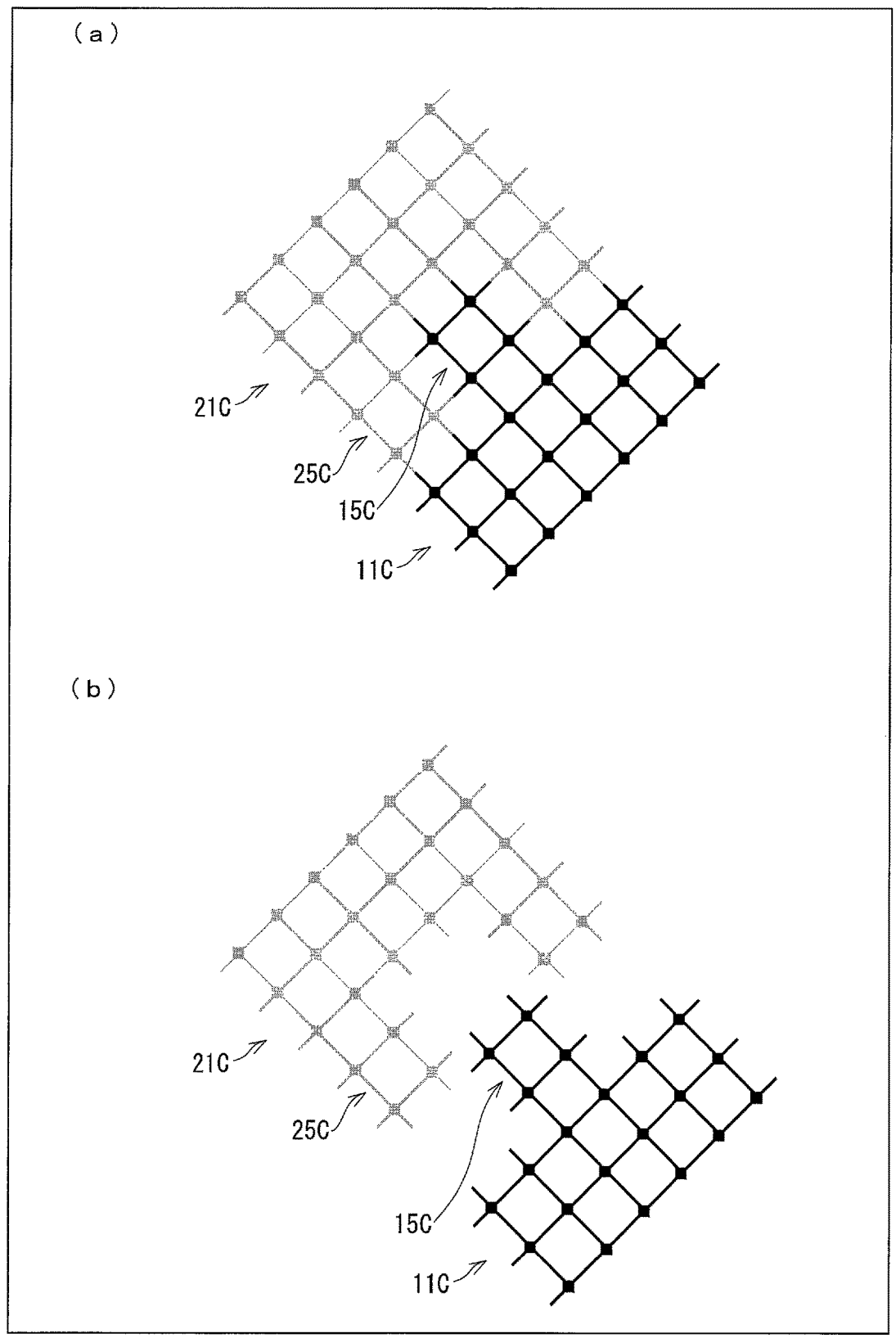
FIG. 13 illustrates views for describing light transmittance of a touch panel substrate of further another modification of the present invention. (a) of FIG. 13 is a plan view of part of a touch panel substrate including a first electrode layer and a second electrode layer properly positioned relative to each other. (b) of each

FIG. 13 illustrates first protrusions 15C each (i) including two unit squares protruding from a large square and arranged outward next to each other and each (ii) having four intersections at the respective four vertices of the outer one of the two unit squares.

Figure 14:
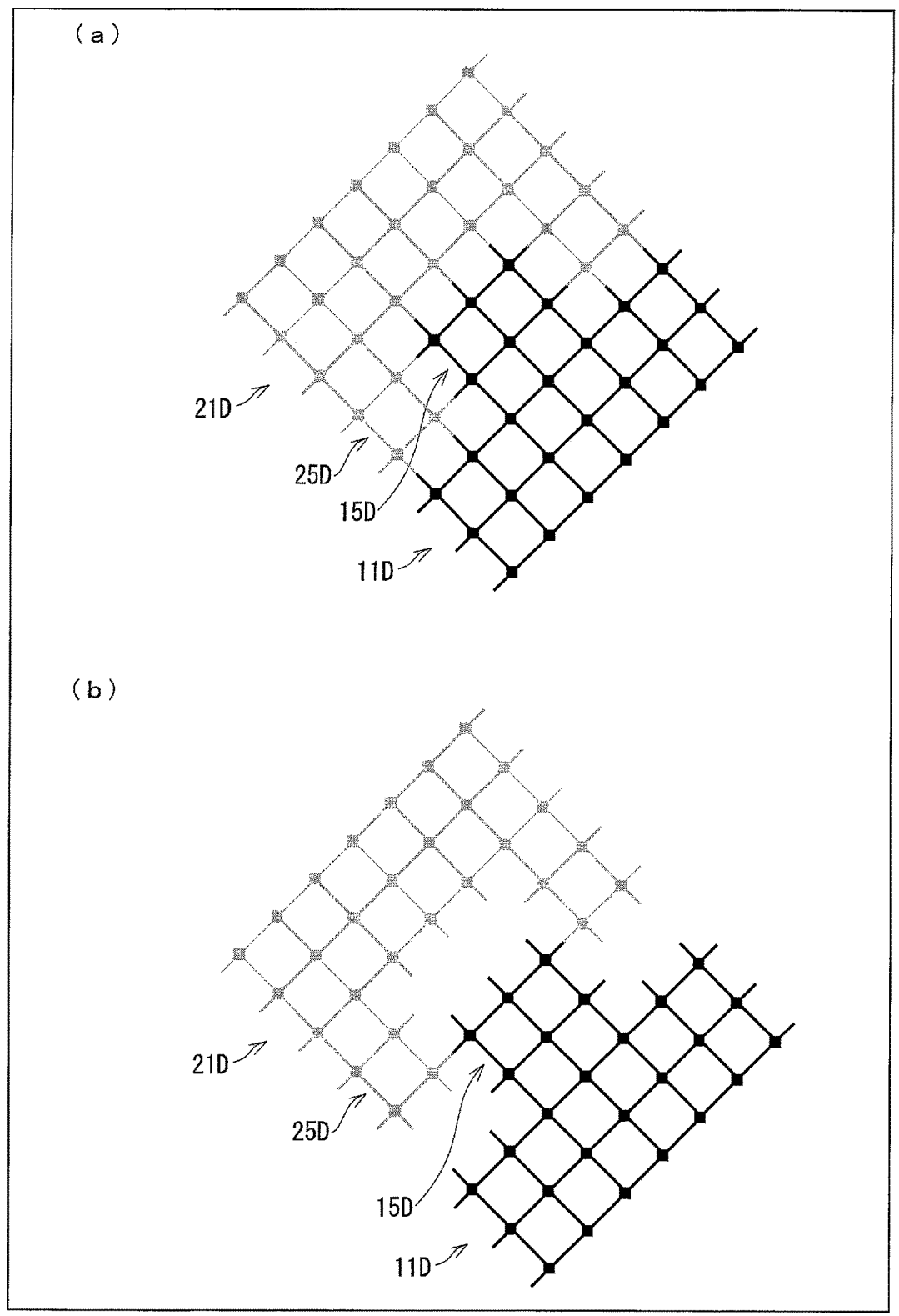
FIG. 14 illustrates views for describing light transmittance of a touch panel substrate of further another modification of the present invention. (a) of FIG. 14 is a plan view of part of a touch panel substrate including a first electrode layer and a second electrode layer properly positioned relative to each other. (b) of each

FIG. 14 illustrates first protrusions 15D each (i) including four unit squares protruding from a large square and arranged in a matrix of two rows by two columns and each (ii) having six intersections at the respective six vertices of the outer two of the four unit squares.

Figure 15:
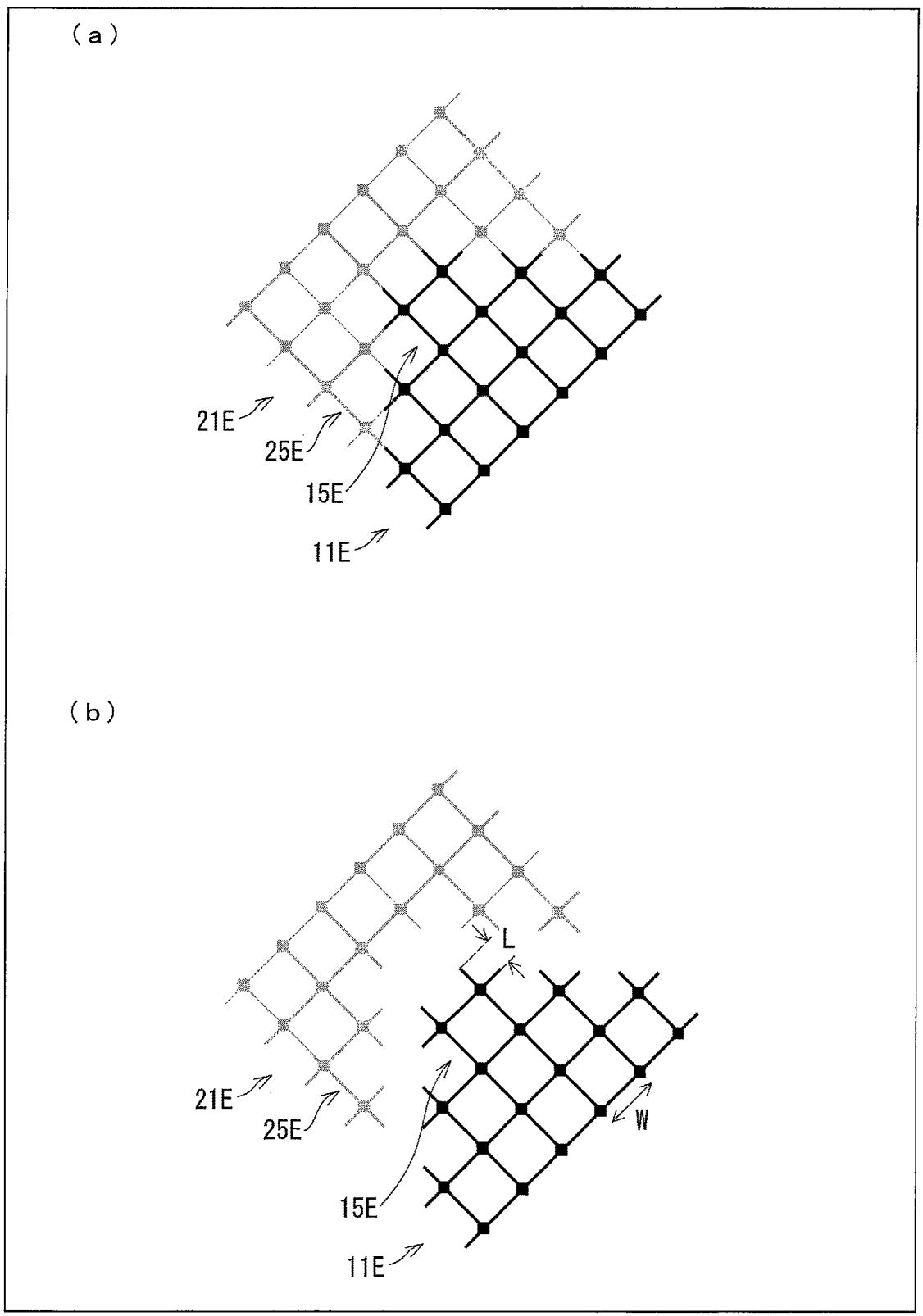
FIG. 15 illustrates views for describing light transmittance of a touch panel substrate of further another modification of the present invention. (a) of FIG. 15 is a plan view of part of a touch panel substrate including a first electrode layer and a second electrode layer properly positioned relative to each other. (b) of each

FIG. 15 illustrates first protrusions 15E each (i) including three unit squares protruding from a large square and another unit square protruding further from the three unit squares and each (iii) having six intersections at respective six vertices of the four unit squares.

As described above, the first protrusions may be in any of various shapes. Although the description above omits dealing with the second protrusions, the second protrusions may vary in shape as with the first protrusions.

<Ends of Sensor Electrodes>

Figure 16:
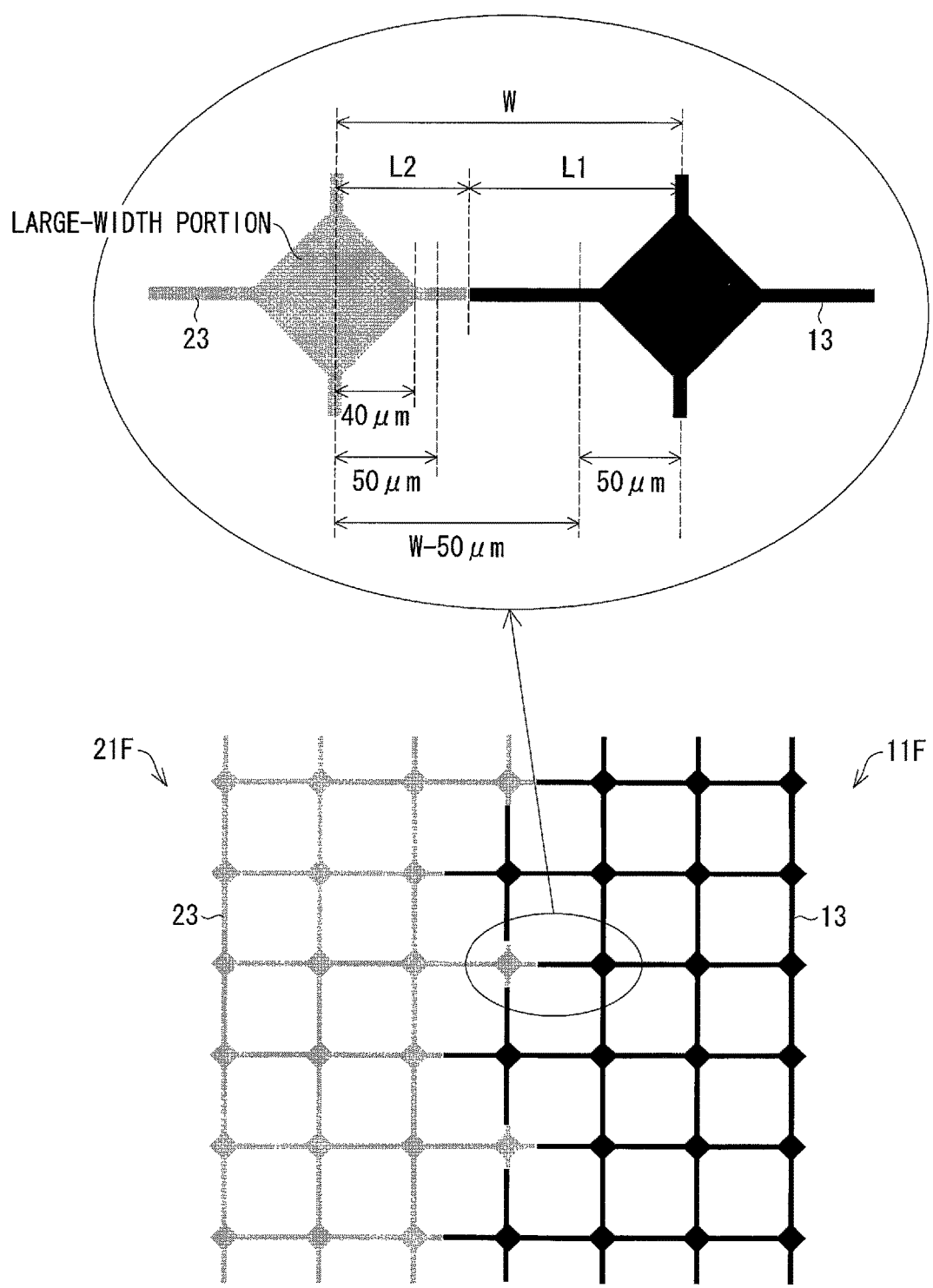
FIG. 16 illustrates (i) a plan view of a boundary between a first sensor electrode and a second sensor electrode and (ii) an enlarged view of a part of the boundary.

The following description will discuss, with reference to FIG. 16, a pattern of conductor lines at an end of each sensor electrode. FIG. 16 illustrates (i) a plan view of a boundary between a first sensor electrode 11F and a second sensor electrode 21F and (ii) an enlarged view of a part of the boundary.

For convenience of description, (i) "W" refers to the length of a side of each unit square, (ii) "L1" refers to the length of a portion of each first conductor line 13 at the boundary which portion extends from an intersection to the tip of the first conductor line 13, and (iii) "L2" refers to the length of a portion of each second conductor line 23 at the boundary which portion extends from an intersection to the tip of the second conductor line 23.

The description below uses the term "large-width portion" to refer to a portion of the grid which portion is, as illustrated in FIG. 16, located near an intersection of conductor lines and wider than a conductor line. The large-width portion is substantially quadrilateral in a plan view, and has diagonal lines parallel to the conductor lines. The large-width portion has a width of approximately 80 μm along the diagonal direction and a width of approximately 40 μm between the center of the large-width portion and each vertex of the large-width portion.

In view of the width of the large-width portion, L2 needs to be larger than 40 for a second conductor line 23 at the boundary between sensor electrodes to have a tip that protrudes from the large-width portion towards a first sensor electrode 21F.

In a case where the conductor lines are etched, the conductor lines may each have a tip that has receded as a result of the etching process. The conductor line pattern is thus preferably designed in view of the width by which the etching process may cause the tip to recede (for example, approximately 10 μm to 30 μm).

In view of (i) the width of the large-width portion and (ii) the width by which the etching process may cause the tip to recede (10 μm), L2 is preferably 50 μm or larger for a second conductor line 23 at the boundary between sensor electrodes to have a tip that protrudes from the large-width portion toward a first sensor electrode 21F. Similarly, L1 is preferably larger than 50 μm. Furthermore, both L1 and L2 are preferably larger than 50 μm and smaller than (w−50) for a first conductor line 13 and a second conductor line 23 not to overlap each other at the boundary between sensor electrodes.

Embodiment 2

Figure 17:
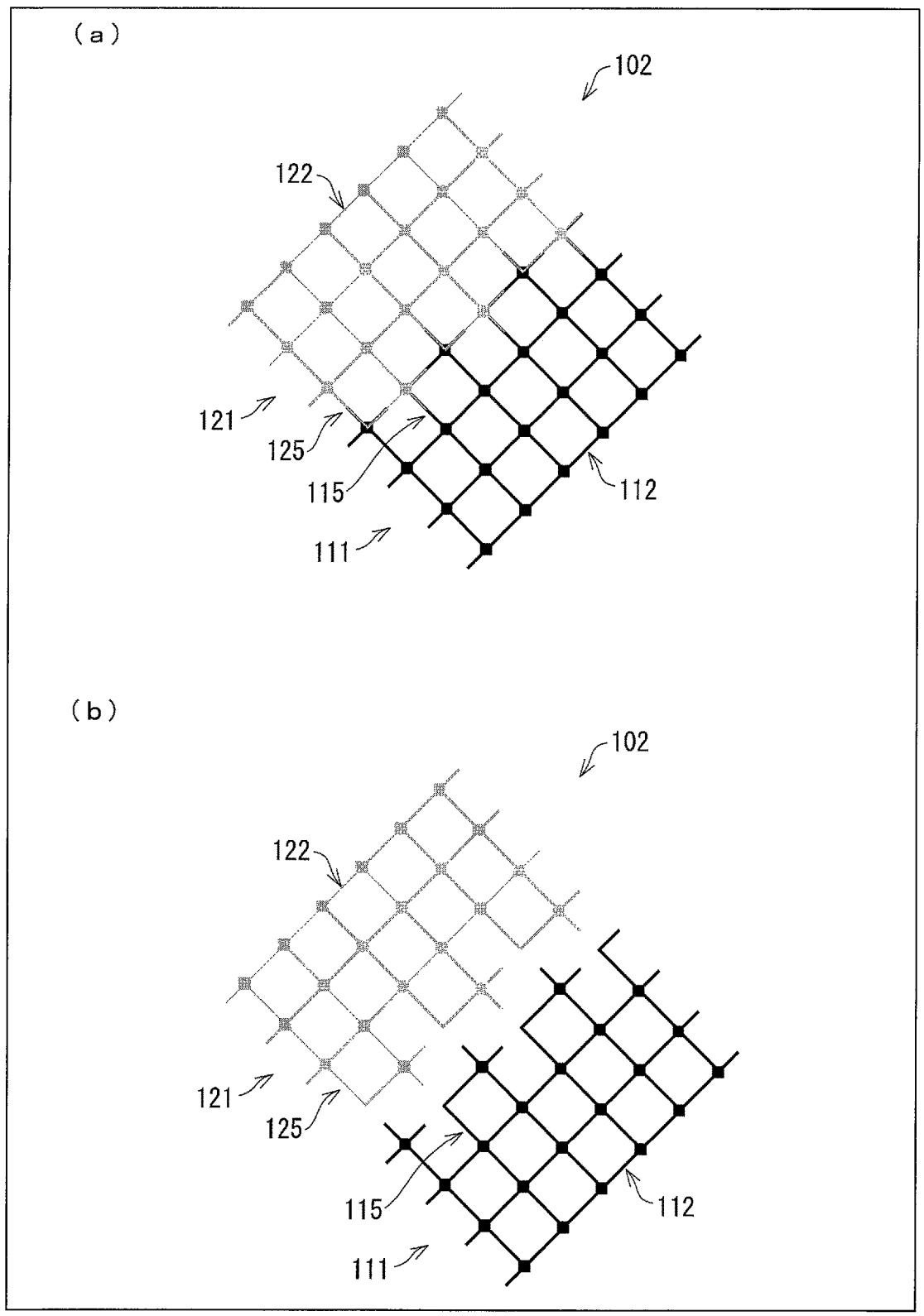
FIG. 17 illustrates views for describing light transmittance of a touch panel substrate of Embodiment 2. (a) of FIG. 17 is a plan view of part of a touch panel substrate including a first electrode layer and a second electrode layer properly positioned relative to each other. (b) of FIG. 17 is a plan view of part of a touch panel substrate including a first electrode layer and a second electrode layer not properly positioned relative to each other.

The following description will discuss, with reference to FIG. 17, another embodiment of the present invention. For convenience of description, members of the present embodiment that have functions identical to those described in the above-described embodiment are given identical reference numerals, and descriptions of such members will be omitted.

FIG. 17 illustrates views for describing light transmittance of a touch panel substrate 2 of the present embodiment. (a) of FIG. 17 is a plan view of part of a touch panel substrate 102 including a first electrode layer and a second electrode layer properly positioned relative to each other. (b) of FIG. 17 is a plan view of part of a touch panel substrate 102 including a first electrode layer and a second electrode layer not properly positioned relative to each other. FIG. 17 corresponds to FIG. 8.

<Protrusions>

The touch panel substrate 102 of the present embodiment includes first protrusions 115 and second protrusions 125.

The first protrusions 115 each include a unit square (first unit square) protruding from the large square of a grid electrode 112. The unit square has two outer vertices, at one of which (i) an intersection is present (that is, two first conductor lines 13 cross each other) and at the other of which two first conductor lines 13 do not cross each other, but a corner is present instead.

Similarly, the second protrusions 125 each include a unit square (second unit square) protruding from the large square of a grid electrode 122. The unit square has two outer vertices, at one of which (i) an intersection is present (that is, two second conductor lines 23 cross each other) and at the other of which two second conductor lines 23 do not cross each other, but a corner is present instead.

In a case where the first electrode layer and the second electrode layer are properly positioned relative to each other, (i) the intersection of the first protrusion 115 and the corner of the second protrusion 125 are placed over each other in a plan view, and (ii) the intersection of the second protrusion 125 and the corner of the first protrusion 115 are placed over each other in a plan view.

With this configuration, the touch panel substrate 102 of the present embodiment has intersections arranged uniformly in a matrix in a plan view similarly to the touch panel substrate 2 of Embodiment 1.

In a case where the conductor lines are etched, the conductor lines are wider at the intersections is wider, but are not so at the corners. The corners thus do not locally decrease light transmittance.

The touch panel substrate 102 of the present embodiment includes first protrusions 115 and second protrusions 125 each including a unit square having a corner. In a case where a first sensor electrode 111 and a second sensor electrode 121 are separated from each other by a gap as illustrated in (b) of FIG. 17, the above configuration prevents a decrease in the conductor line density at the gap more effectively. The above configuration, as a result, effectively eliminates a visibility defect at the boundary between sensor electrodes.

Embodiment 3

The following description will discuss, with reference to FIGS. 18 through 21, another embodiment of the present invention. For convenience of description, members of the present embodiment that have functions identical to those described in the above-described embodiment are given identical reference numerals, and descriptions of such members will be omitted.

<Electrode Layers>

Figure 18:
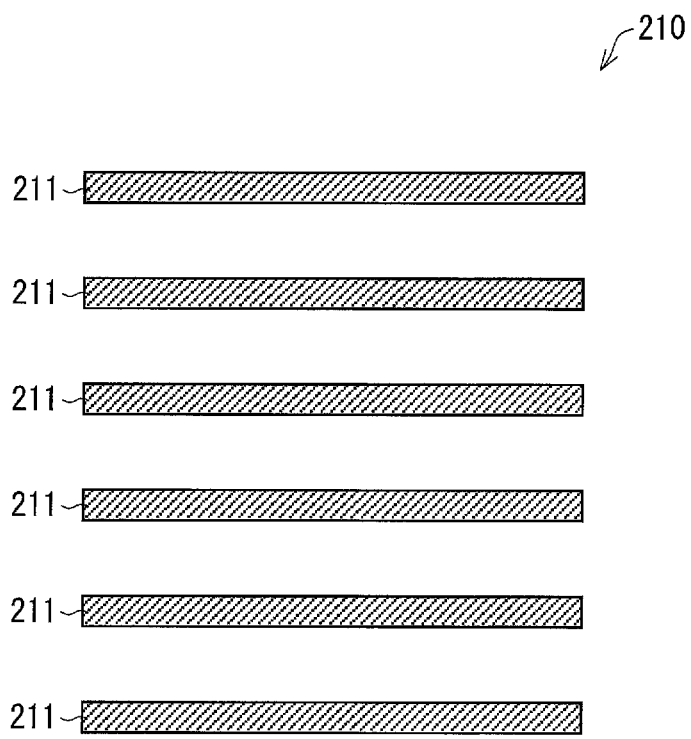
FIG. 18 is a plan view of a configuration of first electrode layers included in a touch panel substrate of Embodiment 3 of the present invention.

FIG. 18 is a plan view of a configuration of the first electrode layer 210 included in the touch panel substrate 202 of the present embodiment. FIG. 19 is a plan view of a configuration of the second electrode layer 220 included in the touch panel substrate 202 of the present embodiment.

Figure 20:
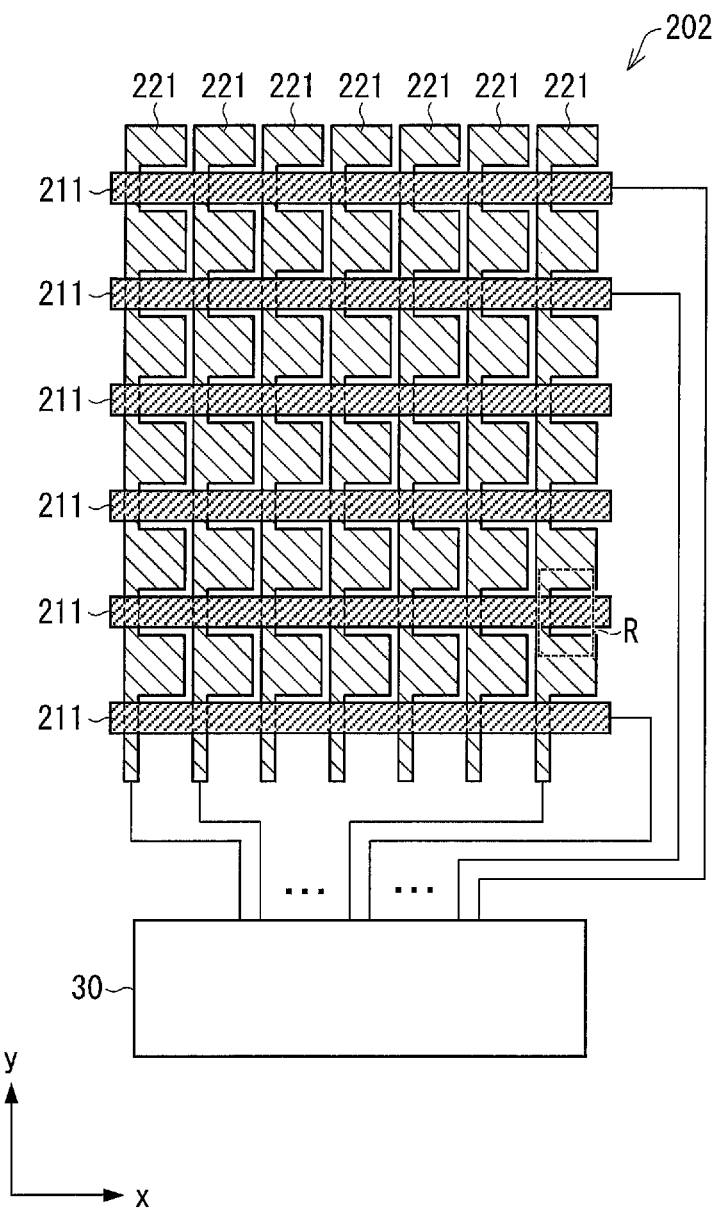
FIG. 20 is a plan view of a configuration of a touch panel substrate of Embodiment 3 including in which configuration a first electrode layer and a second electrode layer are placed over each other.

FIG. 20 is a plan view of a configuration of the touch panel substrate 202 of the present embodiment in which configuration the first electrode layer 210 and the second electrode layer 220 are placed over each other.

As illustrated in FIG. 18, the first electrode layer 210 includes a plurality of first sensor electrodes 211 extending in a lateral direction in FIG. 18. The first sensor electrodes 211 are each in a strip shape (rectangular). Adjacent ones of the plurality of first sensor electrodes 211 are separated from each other at a predetermined interval.

As illustrated in FIG. 19, the second electrode layer 220 includes a plurality of second sensor electrodes 221 extending in a longitudinal direction in FIG. 19. The second sensor electrodes 221 are separated from each other at predetermined intervals. The second sensor electrodes 221 each have an outer edge in the shape of a rectangle as a trunk and a plurality of rectangles each connected as a branch to the rectangle as a trunk. The second sensor electrodes 221, in other words, each have an outer edge in the shape of a strip having, along a long side thereof, a plurality of rectangular recesses.

The recesses of each second sensor electrode 221 are each separated from any adjacent recess at an interval equal to the interval between first sensor electrodes 211 adjacent to each other.

As illustrated in FIG. 20, the touch panel substrate 202 is structured such that the first electrode layer 210 and the second electrode layer 220 are placed over each other so as to sandwich the substrate 6 in such a manner that in a plan view, (i) the first sensor electrodes 211 extending in the X direction in FIG. 20 intersect the second sensor electrodes 221 extending in the Y direction in FIG. 20 and (ii) the first sensor electrodes 211 are placed over the respective recesses of each second sensor electrode 221.

As shown in the region R enclosed by a broken line in FIG. 20, part of the outer edge of each first sensor electrode 211 is in parallel to part of the outer edge of each second sensor electrode 221 in a plan view.

More specifically, the first sensor electrodes 211 have respective outer edges with sides parallel to the X direction in FIG. 20 which sides are close in a plan view to sides of respective outer edges of the second sensor electrodes 221 which sides are parallel to the X direction in FIG. 20.

Figure 21:
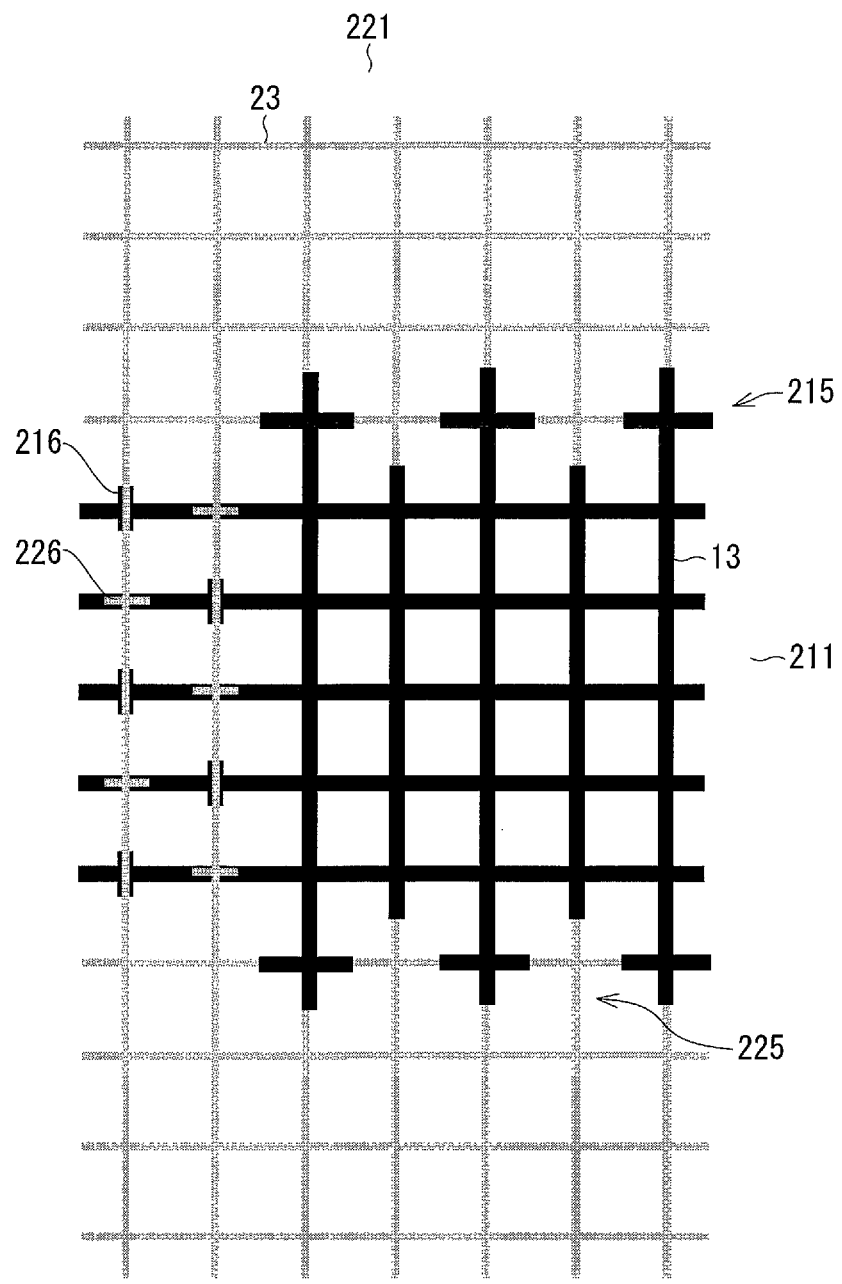
FIG. 21 is a plan view of a crossover section of a sensor electrode and a second sensor electrode of a touch panel substrate of Embodiment 3, and is an enlarged view of the region R enclosed by a line in FIG. 20.
Figure 22:
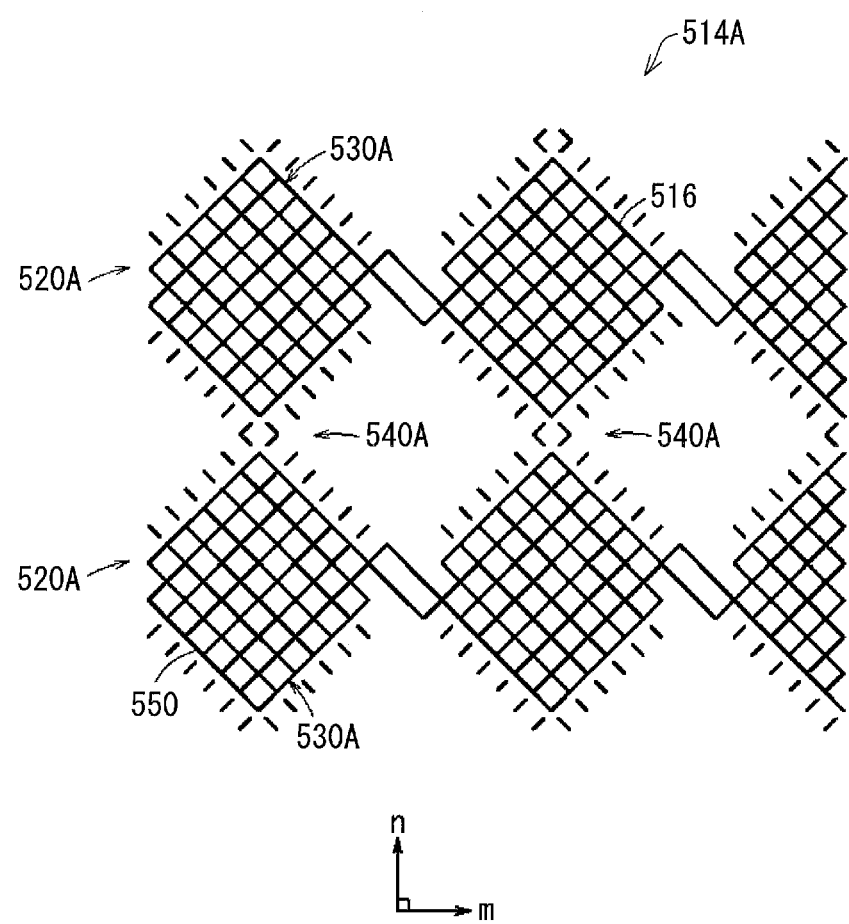
FIG. 22 is a plan view of a first conductive pattern in a first conductive film of Patent Literature 1.
Figure 23:
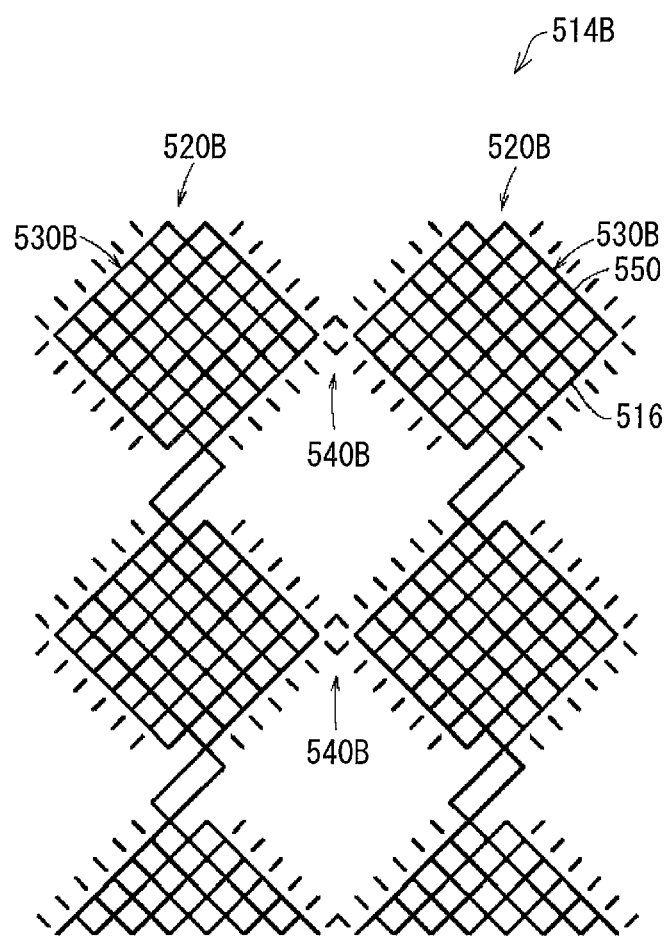
FIG. 23 is a plan view of a second conductive pattern in a second conductive film of Patent Literature 1.
Figure 24:
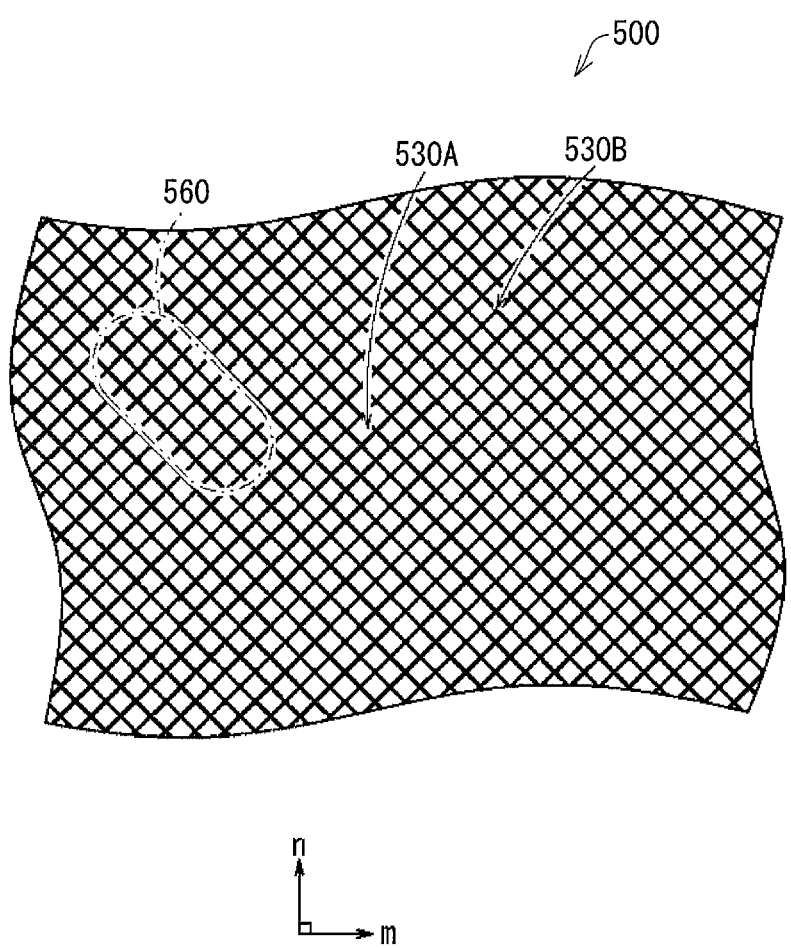
FIG. 24 is a plan view of a layered conductive film of Patent Literature 1 including a first conductive film and a second conductive film attached to each other.

FIG. 21 is a plan view of a crossover section of a sensor electrode 211 and a second sensor electrode 221, and is an enlarged view of the region R enclosed by a line in FIG. 20. For convenience of description, FIG. 21 illustrates (i) first conductor lines 13 with a line width and (ii) second conductor lines 23 with a line width different from that of the first conductor lines 13.

As illustrated in FIG. 21, the touch panel substrate 202 of the present embodiment is arranged similarly to the touch panel substrate 2 of Embodiment 1 such that the first sensor electrodes 211 and the second sensor electrodes 221 each include grid electrodes each having protrusions.

With the above arrangement, the first protrusions 15 and the second protrusions 25 in the region R, enclosed by a broken line, engage alternately with each other at the boundary between a first sensor electrode 211 and a second sensor electrode 221 as illustrated in FIG. 21.

With the above arrangement, the touch panel substrate 202 of the present embodiment has uniform in-plane light transmittance similarly to the touch panel substrate 2 of Embodiment 1. Moreover, the touch panel substrate 202 has uniform in-plane light transmittance even in a case where two electrode layers are not properly positioned relative to each other.

The description below uses (i) the term "first crossover section" to refer to a portion of a first sensor electrode 211 at which portion the first sensor electrode 211 crosses a second sensor electrode 221 in a plan view and (ii) the term "second crossover section" to refer to a portion of a second sensor electrode 221 at which portion the second sensor electrode 221 crosses a first sensor electrode 211 in a plan view.

As illustrated in FIG. 21, the first crossover sections are each formed of a first conductor line 13 and an auxiliary wire 216 crossing that first conductor line 13, whereas the second crossover sections are each formed of a second conductor line 23 and an auxiliary wire 226 crossing that second conductor line 23. The auxiliary wires 216 are each placed over a second conductor line 23 in a plan view, whereas the auxiliary wires 226 are each placed over a first conductor line 13 in a plan view. The auxiliary wires 216 and 226 are preferably as short as possible similarly to the auxiliary wires 16 and 26 of the touch panel substrate 2 of Embodiment 1. The auxiliary wires 216 and 226 may be, for example, shorter than the shorter one of the conductor lines crossing each other in first protrusion 215 and second protrusion 225.

The touch panel substrate 202 of the present embodiment includes first conductor lines 13 and second conductor lines 23 in a uniform net-like pattern (mesh pattern) in a plan view.

Further, each crossover section of a first sensor electrode 211 and a second sensor electrode 221 has intersections arranged uniformly in a matrix in a plan view which intersections include the respective intersections in the first crossover sections and the respective intersections in the second crossover sections.

With the above configuration, the touch panel substrate 202 is arranged to have, over an entire surface, intersections arranged uniformly in a matrix in a plan view which intersections include all the intersections in each first sensor electrode 211 and all the intersections in each second sensor electrode 221.

With the above arrangement, even in a case where the conductor lines are wider at the intersections than in the other regions, the touch panel substrate 202 has uniform in-plane light transmittance.

The auxiliary wires 216 and the auxiliary wires 226 may each have any pattern as long as the touch panel substrate 202 has intersections arranged uniformly in a matrix in a plan view. The touch panel substrate 202 may, for example, include only auxiliary wires 226 and not include auxiliary wires 216.

SUMMARY

A touch panel substrate (2) in accordance with Aspect 1 of the present invention is a touch panel substrate, including: a first electrode layer (10, 10A, 210); a second electrode layer (20, 20A, 220); and an insulating layer (substrate 6), the first electrode layer and the second electrode layer facing each other so as to sandwich the insulating layer, the first electrode layer including a plurality of first electrodes (the first electrodes 11, 11A, 111, 211) which are arranged next to each other and each of which includes conductor lines (the first conductor lines 13) in a net-like pattern, the second electrode layer including a plurality of second electrodes (the second electrodes 21, 21A, 121, 221) which are arranged next to each other and each of which includes conductor lines (the second conductor lines 23) in a net-like pattern, the plurality of first electrodes each including, at a portion parallel to an outer edge of an adjacent second electrode, a plurality of first protrusions (15, 15B, 15C, 15D, 15E, 115) protruding toward the adjacent second electrode in a plan view, the plurality of first protrusions each having an intersection at which two conductor lines cross each other, the plurality of second electrodes each including, at a portion parallel to an outer edge of an adjacent first electrode, a plurality of second protrusions (25, 25B, 25C, 25D, 25E, 125) protruding toward the adjacent first electrode in a plan view, the plurality of second protrusions each having an intersection at which two conductor lines cross each other, the plurality of first electrodes and the plurality of second electrodes being placed in such a manner that the plurality of first protrusions and the plurality of second protrusions engage alternately with each other in a plan view.

Typically, the conductor lines are wider at the intersections. This results in an increased conductor line density and decreased light transmittance at each of the intersections in a plan view.

The touch panel substrate of the present invention, which touch panel substrate is configured as above to include first protrusions and second protrusions, has intersections even at the boundary between each first sensor electrode and any adjacent second sensor electrode in a plan view. The above configuration thus prevents an increase in light transmittance at the boundary between each first sensor electrode and any adjacent second sensor electrode, and allows the touch panel substrate to have uniform in-plane light transmittance.

Further, the touch panel substrate of the present invention is arranged such that the first protrusions and the second protrusions engage alternately with each other in a plan view. Thus, even in a case where the first electrode layer and the second electrode layer are not properly positioned relative to each other, the first sensor electrodes and the second sensor electrodes are not easily separated from each other by gaps. The above configuration further prevents a linear arrangement of regions in each of which no intersection is present.

With the above configuration, even in a case where two electrode layers are not properly positioned relative to each other, the touch panel substrate of the present invention has uniform in-plane light transmittance.

The touch panel substrate in accordance with Aspect 2 of the present invention may be arranged such that, in Aspect 1, the conductor lines of the plurality of first electrodes and the conductor lines of the plurality of second electrodes combine with each other so as to form a uniform net-like pattern in a plan view; and the intersections in the plurality of first electrodes and the intersections in the plurality of second electrodes are together arranged uniformly in a matrix in a plan view.

Conventional touch panel substrates do not have a uniform in-plane arrangement of intersections, and unfortunately let the light transmittance be increased locally.

In contrast, the touch panel substrate of the present invention, which touch panel substrate has the above configuration, has intersections arranged uniformly in a matrix. The touch panel substrate of the present invention thus has uniform in-plane light transmittance.

The touch panel substrate in accordance with Aspect 3 of the present invention may be arranged such that: in Aspect 1 or 2, the intersections in the plurality of first protrusions and the intersections in the plurality of second protrusions are together arranged on a straight line at a boundary between each first electrode and any adjacent second electrode.

The above configuration allows the intersections to be arranged regularly even at the boundary between each first sensor electrode and any adjacent second sensor electrode. The touch panel substrate of the present invention thus has uniform in-plane light transmittance.

The touch panel substrate in accordance with Aspect 4 of the present invention may be arranged such that, in any one of Aspects 1 through 3, the conductor lines of the plurality of first electrodes, which conductor lines are in a net-like pattern, and the conductor lines of the plurality of second electrodes, which conductor lines are in a net-like pattern, provide a plurality of unit squares, each of which serves as a minimum unit square; the plurality of first protrusions each include a first unit square protruding toward the adjacent second electrode in a plan view; the plurality of first protrusions each have (i) the intersection at a vertex of the first unit square and (ii) a corner at another vertex of the first unit square at which corner no two conductor lines cross each other; the plurality of second protrusions each include a second unit square protruding toward the adjacent first electrode in a plan view; the plurality of second protrusions each have (i) the intersection at a vertex of the second unit square and (ii) a corner at another vertex of the second unit square at which corner no two conductor lines cross each other; the respective corners of the plurality of first protrusions are each placed over a corresponding one of the respective intersections in the plurality of second protrusions in a plan view; and the respective corners of the plurality of second protrusions are each placed over a corresponding one of the respective intersections in the plurality of first protrusions in a plan view.

In a case where a first electrode and a second electrode are separated from each other by a gap, the above configuration prevents a decrease in the conductor line density at the gap more effectively. The above configuration, as a result, effectively eliminates a visibility defect at the boundary between electrodes.

The touch panel substrate in accordance with Aspect 5 of the present invention can be arranged such that, in any one of Aspects 1 through 4, the conductor lines of the plurality of first electrodes, which conductor lines are in a net-like pattern, and the conductor lines of the plurality of second electrodes, which conductor lines are in a net-like pattern, provide a plurality of unit squares, each of which serves as a minimum unit square; and a conductor line length between (i) the intersection in each of the plurality of first protrusions and (ii) a tip of the first protrusion is 50 μm or longer and (w−50) μm or shorter, where w represents a length of a side of at least one of the unit squares.

The touch panel substrate in accordance with Aspect 6 of the present invention can be arranged such that, in any one of Aspects 1 through 5, the plurality of first electrodes each include (i) a plurality of first grid electrodes (grid electrode 12) each having a quadrilateral shape and (ii) first connection sections (14, 14A) each electrically connecting two of the plurality of first grid electrodes to each other; the plurality of second electrodes each include (i) a plurality of second grid electrodes (grid electrode 22) each having a quadrilateral shape and (ii) second connection sections (24, 24A) each electrically connecting two of the plurality of second grid electrodes to each other; at least either the first connection sections or the second connection sections have an intersection at which two conductor lines cross each other; and the first connection sections are each placed over a corresponding one of the second connection sections in a plan view in such a manner that the intersections are together arranged uniformly in a matrix in a plan view.

The above configuration allows intersections to be provided in a region in which a first connection section and a second connection section are placed over each other in a plan view. The touch panel substrate of the present invention has uniform in-plane light transmittance.

The touch panel substrate in accordance with Aspect 7 of the present invention can be arranged such that, in Aspect 6, a shorter one of the two conductor lines crossing each other at the intersection in each of the first connection sections is shorter than a shorter one of the two conductor lines crossing each other at the intersection in each of the plurality of first protrusions.

The first connection sections have respective intersections at which conductor lines cross each other, the conductor lines being placed over the conductor lines of the second connection sections in a plan view.

With this configuration, in a case where a shorter one (auxiliary wire 16) of the two conductor lines crossing each other at the intersection in each of the first connection sections is as short as possible as described above, it is possible to prevent an increase in light transmittance at the crossover section of a first connection section and a second connection section even in a case where due to mispositioning between the first electrode layer and the second electrode layer, a shorter one of the two conductor lines crossing each other at the intersection in each of the first connection sections is not placed over a conductor line of a second connection section.

The touch panel substrate in accordance with Aspect 8 of the present invention can be arranged such that, in any one of Aspects 1 through 5, the plurality of first electrodes each include a first crossover section at which the first electrode crosses a second electrode in a plan view; the plurality of second electrodes each include a second crossover section at which the second electrode crosses a first electrode in a plan view; at least either the first crossover sections or the second crossover sections each have an intersection at which two conductor lines cross each other; and the plurality of first electrodes and the plurality of second electrodes are arranged so that the plurality of first electrodes cross the plurality of second electrodes in a plan view in such a manner that the intersections in at least either the first crossover sections or the second crossover sections are arranged uniformly in a matrix in a plan view.

The above configuration allows intersections to be arranged uniformly in a matrix in the first crossover sections and the second crossover sections in a plan view. The touch panel substrate of the present invention has uniform in-plane light transmittance.

The touch panel substrate in accordance with Aspect 9 of the present invention can be arranged such that, in Aspect 8, a shorter one of the two conductor lines crossing each other at the intersection in each of the first crossover sections is shorter than a shorter one of the two conductor lines crossing each other at the intersection in each of the plurality of first protrusions.

With this configuration, it is possible to prevent an increase in light transmittance at the first crossover sections and the second crossover sections even in a case where due to mispositioning between the first electrode layer and the second electrode layer, a shorter one of the two conductor lines crossing each other at the intersection in each of the first connection sections is not placed over a conductor line of a second crossover section.

An electronic device (1) in accordance with Aspect 10 of the present invention can include a touch panel substrate recited in any one of Aspects 1 through 9 and a display device (3).

With this configuration, it is possible to provide an electronic device having improved uniformity in in-plane light transmittance.

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, by a combination of technical means disclosed in different embodiments, a new technical feature can be derived.

INDUSTRIAL APPLICABILITY

The present invention is preferably applicable to touch panel substrates including electrodes made up of conductor lines.

REFERENCE SIGNS LIST

1: Electronic device
2, 102, 202: Touch panel substrate
3: Display Device
10, 10A, 210: First electrode layer
11, 11A, 111, 211: First sensor electrode (First electrode)
12, 112: Grid electrode (First grid electrode)
13: First conductor line (Conductor line)
14, 14A: First connection section
15, 15B, 15C, 15D, 15E, 115: First protrusion
20, 20A, 220: Second electrode layer
21. 21A. 121, 221: Second sensor electrode (Second electrode)
22, 122: Grid electrode (Second grid electrode)
23: Second conductor line (Conductor line)
24, 24A: Second connection section
25, 25B, 25C, 25D, 25E, 125: Second protrusion

The invention claimed is:
1. A touch panel substrate, comprising:
a first electrode layer;
a second electrode layer; and
an insulating layer,
the first electrode layer and the second electrode layer facing each other so as to sandwich the insulating layer,
the first electrode layer including a plurality of first electrodes which are arranged next to each other and each of which includes conductor lines in a net-like pattern,
the second electrode layer including a plurality of second electrodes which are arranged next to each other and each of which includes conductor lines in a net-like pattern, the plurality of first electrodes each including, at a portion parallel to an outer edge of an adjacent second electrode, a plurality of first protrusions protruding toward the adjacent second electrode in a plan view, the plurality of first protrusions each having an intersection at which two conductor lines cross each other, the plurality of second electrodes each including, at a portion parallel to an outer edge of an adjacent first electrode, a plurality of second protrusions protruding toward the adjacent first electrode in a plan view, the plurality of second protrusions each having an intersection at which two conductor lines cross each other, the plurality of first electrodes and the plurality of second electrodes being placed in such a manner that the plurality of first protrusions and the plurality of second protrusions engage alternately with each other in a plan view.

2. The touch panel substrate as set forth in claim 1, wherein:
the conductor lines of the plurality of first electrodes and the conductor lines of the plurality of second electrodes combine with each other so as to form a uniform net-like pattern in a plan view; and
the intersections in the plurality of first electrodes and the intersections in the plurality of second electrodes are together arranged uniformly in a matrix in a plan view.

3. The touch panel substrate as set forth in claim 1, wherein:
the intersections in the plurality of first protrusions and the intersections in the plurality of second protrusions are together arranged on a straight line at a boundary between a first electrode and an adjacent second electrode.

4. The touch panel substrate as set forth in claim 1, wherein:
the conductor lines of the plurality of first electrodes, which conductor lines are in a net-like pattern, and the conductor lines of the plurality of second electrodes, which conductor lines are in a net-like pattern, provide a plurality of unit squares, each of which serves as a minimum unit square;
the plurality of first protrusions each include a first unit square protruding toward the adjacent second electrode in a plan view;
the plurality of first protrusions each have (i) the intersection at a vertex of the first unit square and (ii) a corner at another vertex of the first unit square at which corner no two conductor lines cross each other;
the plurality of second protrusions each include a second unit square protruding toward the adjacent first electrode in a plan view;
the plurality of second protrusions each have (i) the intersection at a vertex of the second unit square and (ii) a corner at another vertex of the second unit square at which corner no two conductor lines cross each other;
the respective corners of the plurality of first protrusions are each placed over a corresponding one of the respective intersections in the plurality of second protrusions in a plan view; and
the respective corners of the plurality of second protrusions are each placed over a corresponding one of the respective intersections in the plurality of first protrusions in a plan view.

5. The touch panel substrate as set forth in claim 1, wherein:

the conductor lines of the plurality of first electrodes, which conductor lines are in a net-like pattern, and the conductor lines of the plurality of second electrodes, which conductor lines are in a net-like pattern, provide a plurality of unit squares, each of which serves as a minimum unit square; and
a conductor line length between (i) the intersection in at least one of the first protrusions and (ii) a tip of the first protrusion is 50 μm or longer and (w-50) μm or shorter, where w represents a length of a side of each of the plurality of unit squares.

6. The touch panel substrate as set as forth in claim 1, wherein:
the plurality of first electrodes each include (i) a plurality of first grid electrodes each having a quadrilateral shape and (ii) first connection sections each electrically connecting two of the plurality of first grid electrodes to each other;
the plurality of second electrodes each include (i) a plurality of second grid electrodes each having a quadrilateral shape and (ii) second connection sections each electrically connecting two of the plurality of second grid electrodes to each other;
at least either the first connection sections or the second connection sections have an intersection at which two conductor lines cross each other; and
the first connection sections are each placed over a corresponding one of the second connection sections in a plan view in such a manner that the intersections are together arranged uniformly in a matrix in a plan view.

7. The touch panel substrate as set as forth in claim 6, wherein:
a shorter one of the two conductor lines crossing each other at the intersection in each of the first connection sections is shorter than a shorter one of the two conductor lines crossing each other at the intersection in each of the plurality of first protrusions.

8. The touch panel substrate as set as forth in claim 1, wherein:
the plurality of first electrodes each include a first crossover section at which the first electrode crosses a second electrode in a plan view;
the plurality of second electrodes each include a second crossover section at which the second electrode crosses a first electrode in a plan view;
at least either the first crossover sections or the second crossover sections each have an intersection at which two conductor lines cross each other; and
the plurality of first electrodes and the plurality of second electrodes are arranged so that the plurality of first electrodes cross the plurality of second electrodes in a plan view in such a manner that the intersections are arranged uniformly in a matrix in a plan view.

9. The touch panel substrate as set as forth in claim 8, wherein:
a shorter one of the two conductor lines crossing each other at the intersection in each of the first crossover sections is shorter than a shorter one of the two conductor lines crossing each other at the intersection in each of the plurality of first protrusions.

10. An electronic device, comprising:
a touch panel substrate recited in claim 1; and
a display device.

* * * * *